US008245391B2

United States Patent
Rubel

(10) Patent No.: US 8,245,391 B2
(45) Date of Patent: Aug. 21, 2012

(54) METHOD OF MANUFACTURING A HYSTERETIC MEMS TWO-DIMENSIONAL THERMAL DEVICE

(75) Inventor: Paul J. Rubel, Santa Barbara, CA (US)

(73) Assignee: Innovative Micro Technology, Goleta, CA (US)

( * ) Notice: Subject to any disclaimer, the term of this patent is extended or adjusted under 35 U.S.C. 154(b) by 414 days.

(21) Appl. No.: 12/588,060

(22) Filed: Oct. 2, 2009

(65) Prior Publication Data

US 2010/0018021 A1    Jan. 28, 2010

Related U.S. Application Data

(60) Division of application No. 11/705,738, filed on Feb. 14, 2007, now Pat. No. 7,626,311, which is a continuation-in-part of application No. 11/334,438, filed on Jan. 19, 2006, now Pat. No. 7,548,145.

(51) Int. Cl.
*H05K 3/02* (2006.01)
*H05K 3/10* (2006.01)
(52) U.S. Cl. ............ 29/846; 29/874; 310/307; 337/139; 337/393
(58) Field of Classification Search .................. 60/527; 257/528; 310/307, 309; 337/14, 139, 393; 29/830, 831, 846, 847, 874
See application file for complete search history.

(56) References Cited

U.S. PATENT DOCUMENTS

| 5,962,949 | A | 10/1999 | Dhuler et al. |
| 6,483,419 | B1* | 11/2002 | Weaver et al. ............ 337/393 |
| 6,617,185 | B1 | 9/2003 | Geisberger |
| 6,876,056 | B2* | 4/2005 | Tilmans et al. ............ 257/528 |
| 7,036,312 | B2* | 5/2006 | Menard et al. ............ 60/527 |
| 2002/0021053 | A1 | 2/2002 | Wood et al. |
| 2003/0024243 | A1 | 2/2003 | Gianchandani et al. |
| 2004/0166602 | A1 | 8/2004 | Wang et al. |
| 2004/0211178 | A1 | 10/2004 | Menard et al. |
| 2004/0261412 | A1 | 12/2004 | Hickey |
| 2005/0146404 | A1 | 7/2005 | Yeatman |
| 2007/0045781 | A1 | 3/2007 | Carlson et al. |
| 2007/0045820 | A1 | 3/2007 | Rybnicek et al. |
| 2007/0096860 | A1 | 5/2007 | Foster et al. |
| 2007/0170811 | A1 | 7/2007 | Rubel et al. |
| 2008/0006850 | A1 | 1/2008 | Rybnicek et al. |
| 2008/0079120 | A1 | 4/2008 | Foster et al. |

* cited by examiner

*Primary Examiner* — Donghai D. Nguyen
(74) *Attorney, Agent, or Firm* — Jaquelin K. Spong

(57) ABSTRACT

A MEMS hysteretic thermal device may be formed having two passive beam segments driven by a current-carrying loop coupled to the surface of a substrate. The first beam segment is configured to move in a direction having a component perpendicular to the substrate surface, whereas the second beam segment is configured to move in a direction having a component parallel to the substrate surface. By providing this two-dimensional motion, a single MEMS hysteretic thermal device may by used to close a switch having at least one stationary contact affixed to the substrate surface.

19 Claims, 21 Drawing Sheets

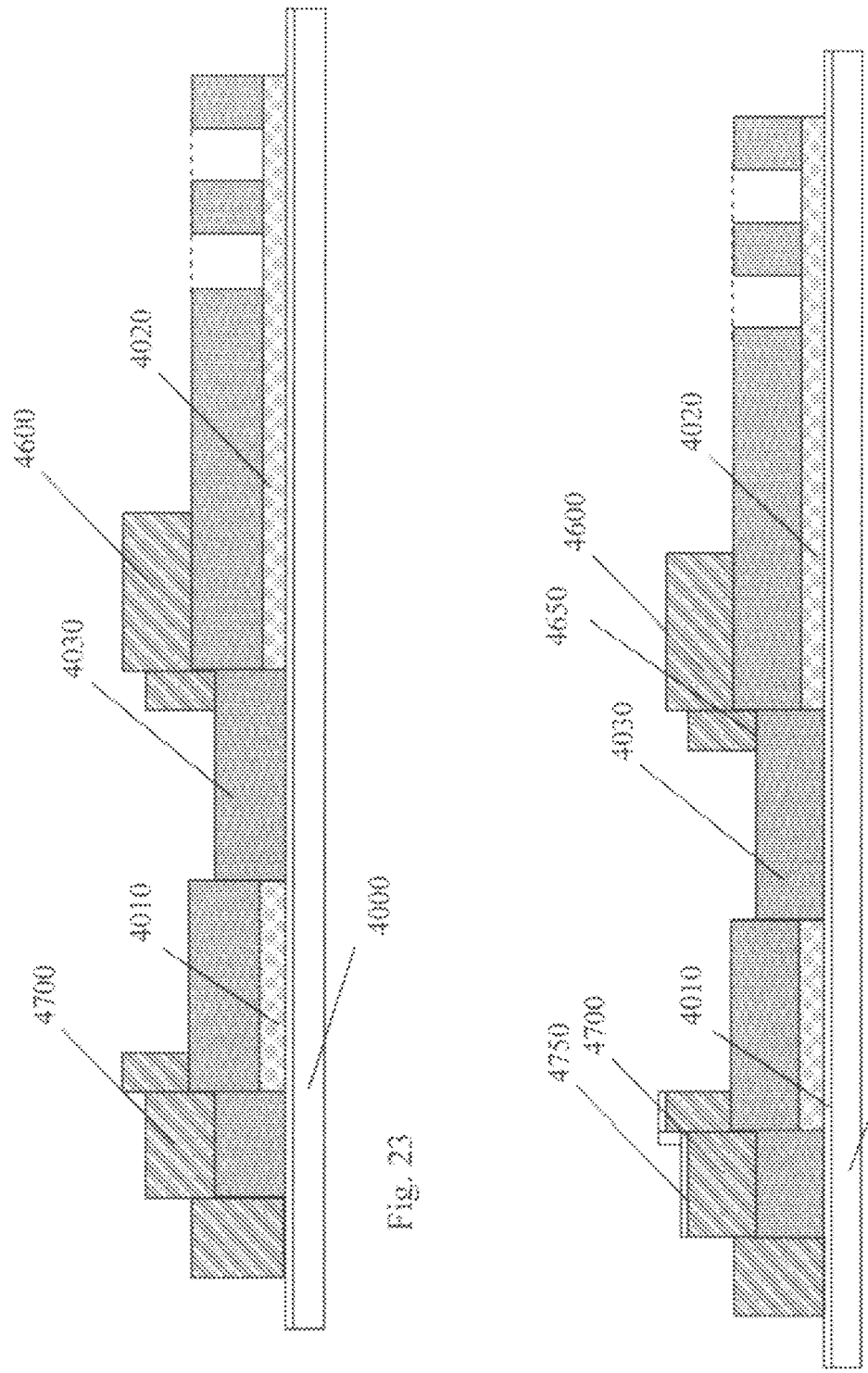

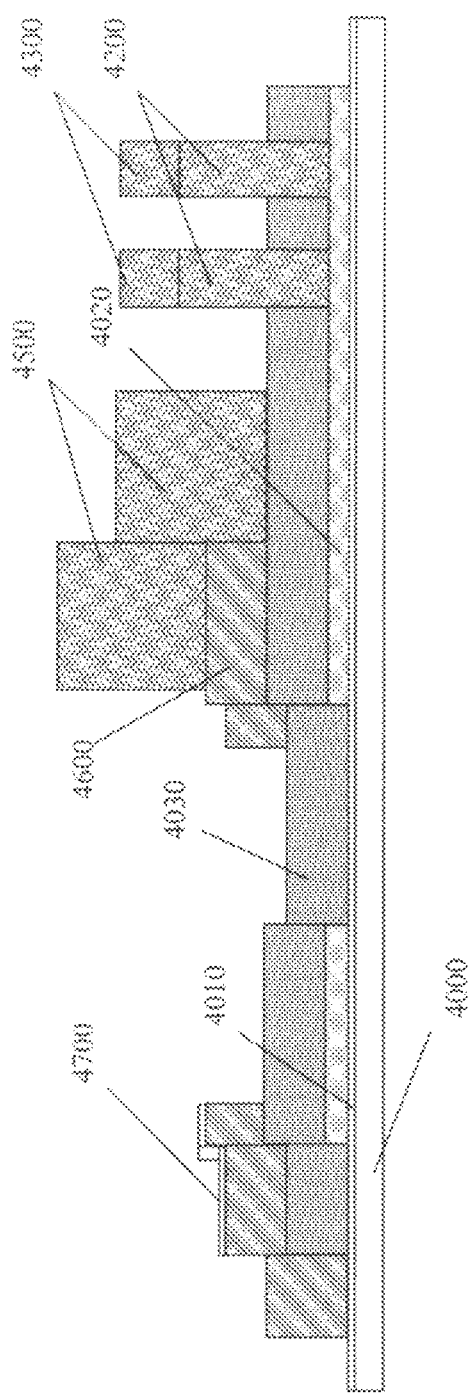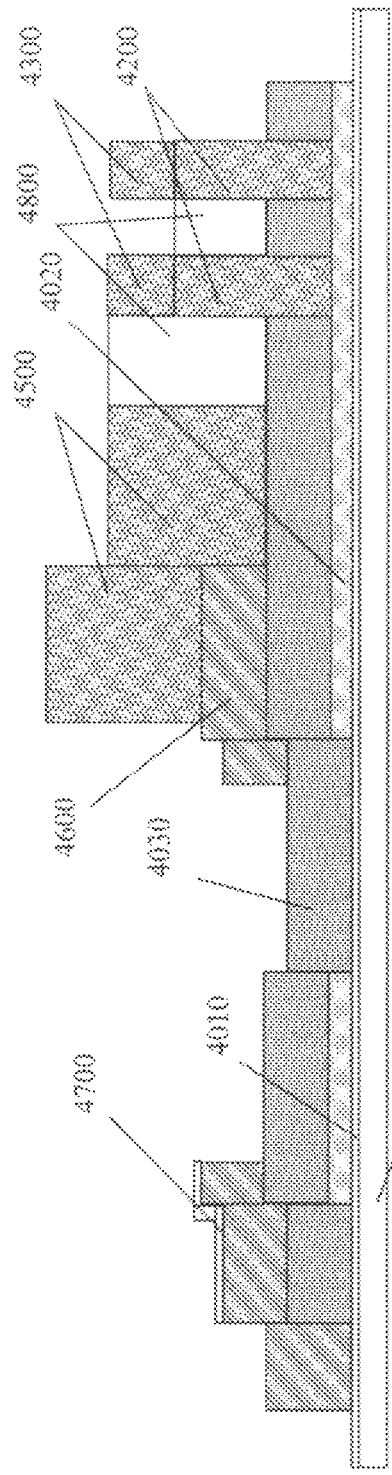

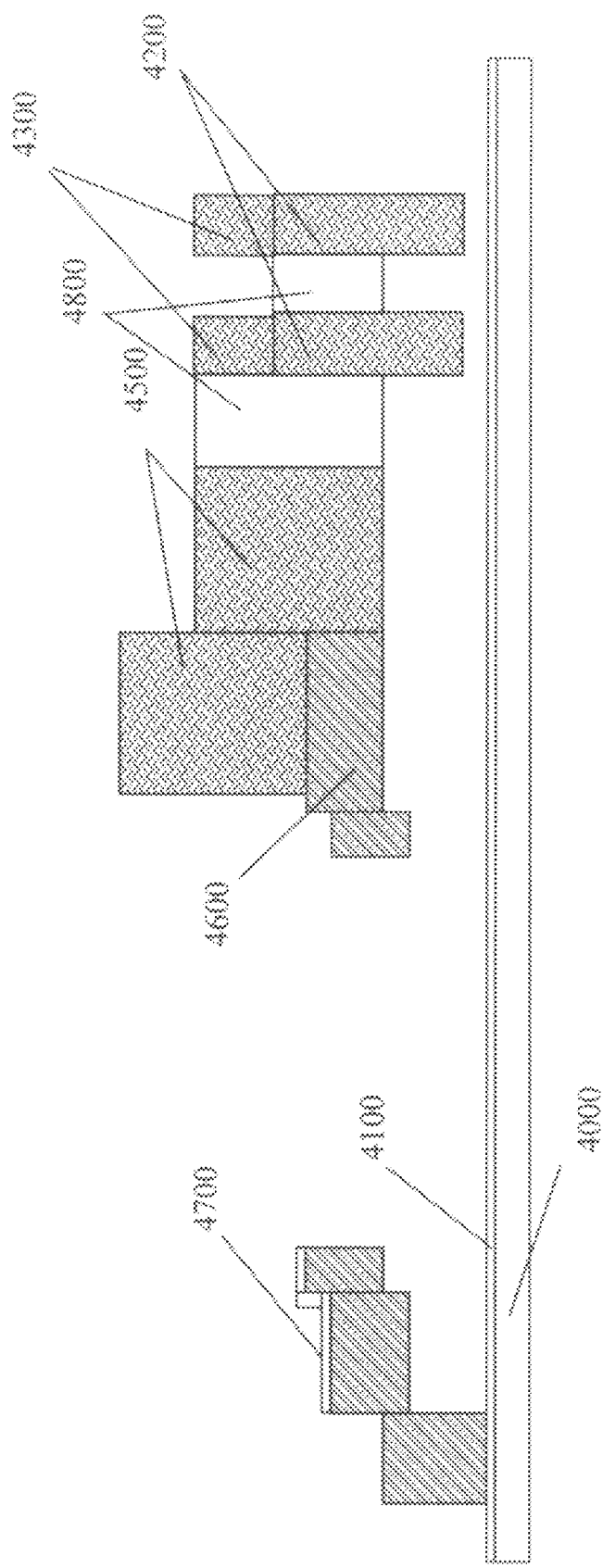

METHOD OF MANUFACTURING A HYSTERETIC MEMS TWO-DIMENSIONAL THERMAL DEVICE

CROSS REFERENCE TO RELATED APPLICATIONS

This U.S. Patent Application is a divisional application of U.S. patent application Ser. No. 11/705,738 filed Feb. 14, 2007, issued as U.S. Pat. No. 7,626,311, which is a continuation-in-part of U.S. patent application Ser. No. 11/334,438, filed Jan. 19, 2006, issued as U.S. Pat. No. 7,548,145, each of which is hereby incorporated by reference in its entirety.

STATEMENT REGARDING FEDERALLY SPONSORED RESEARCH

Not applicable.

STATEMENT REGARDING MICROFICHE APPENDIX

Not applicable.

BACKGROUND

This invention relates to a microelectromechanical systems (MEMS) thermal device, and its method of manufacture. More particularly, this invention relates to a MEMS thermal actuator which is constructed with at least two segments, each segment pivoting about a different point, and with motion hysteresis between the heating phase and the cooling phase.

Microelectromechanical systems (MEMS) are very small moveable structures made on a substrate using lithographic processing techniques, such as those used to manufacture semiconductor devices. MEMS devices may be moveable actuators, valves, pistons, or switches, for example, with characteristic dimensions of a few microns to hundreds of microns. A moveable MEMS switch, for example, may be used to connect one or more input terminals to one or more output terminals, all microfabricated on a substrate. The actuation means for the moveable switch may be thermal, piezoelectric, electrostatic, or magnetic, for example.

FIG. 1 shows an example of a prior art thermal switch, such as that described in U.S. Patent Application Publication 2004/0211178 A1. The thermal switch 10 includes two cantilevers, 100 and 200. Each cantilever 100 and 200 contains a passive beam 110 and 210, respectively, which pivot about fixed anchor points 155 and 255, respectively. A conductive circuit 120 and 220, is coupled to each passive beam 110 and 210 by a plurality of dielectric tethers 150 and 250, respectively. When a voltage is applied between terminals 130 and 140, a current is driven through conductive circuit 120. The Joule heating generated by the current causes the circuit 120 to expand relative to the unheated passive beam 110. Since the circuit is coupled to the passive beam 110 by the dielectric tether 150, the expanding conductive circuit drives the passive beam in the upward direction 165.

Applying a voltage between terminals 230 and 240 causes heat to be generated in circuit 220, which drives passive beam 210 in the direction 265 shown in FIG. 1. Therefore, one beam 100 moves in direction 165 and the other beam 200 moves in direction 265. These movements may be used to open and close a set of contacts located on contact flanges 170 and 270, each in turn located on tip members 160 and 260, respectively. The sequence of movement of contact flanges 170 and 270 on tip members 160 and 260 of switch 10 is shown in FIGS. 2a-2d, to close and open the electrical switch 10.

To begin the closing sequence, in FIG. 2a, tip member 160 and contact flange 170 are moved about 10 μm in the direction 165 by the application of a voltage between terminals 130 and 140. In FIG. 2b, tip member 260 and contact flange 270 are moved about 17 μm in the direction 265 by application of a voltage between terminals 230 and 240. This distance is required to move twice the 5 μm width of the contacts, a 4 μm initial offset between the contact flanges 170 and 270, and additional margin for tolerances of 3 μm. In FIG. 2c, tip member 160 and contact flange 170 are brought back to their initial position by removing the voltage between terminals 130 and 140. This stops current from flowing and cools the cantilever 100 and it returns to its original position. In FIG. 2d, tip member 260 and contact flange 270 are brought back to nearly their original position by removing the voltage between terminals 230 and 240. However, in this position, tip member 160 and contact flange 170 prevent tip member 260 and contact flange 270 from moving completely back to their original positions, because of the mechanical interference between contact flanges 170 and 270. In this position, contact between the faces of contact flanges 170 and 270 provides an electrical connection between cantilevers 100 and 200, such that in FIG. 2d, the electrical switch is closed. Opening the electrical switch is accomplished by reversing the movements in the steps shown in FIGS. 2a-2d.

SUMMARY

The switch construction and method of manufacture may be simplified if a single MEMS actuator is capable of moving in two different directions, rather than having two MEMS actuators each moving in a single direction as shown. If a MEMS actuator is capable of moving in two different directions, then a MEMS switch using a fixed contact may be made using a single MEMS actuator. Furthermore, if the motion of the device is hysteretic, i.e. the motion is different upon heating than it is upon cooling, the actuator may be designed so as to latch in a détente position against the contact. If such an actuator can be designed, then the control of the switch may also be simplified, because only the single actuator may need to be controlled. Accordingly, it is desirable to design and fabricate a MEMS actuator which is capable of moving in two substantially different directions, and with motion which is hysteretic.

A MEMS device is described, which includes a cantilevered beam that bends about one or more points in at least two substantially different directions. The MEMS device also includes a driving means coupled to the cantilever, wherein the driving means may include a drive beam tethered to the cantilever by at least one tether. Upon heating the drive beam, the drive beam expands to deform the cantilever. Upon cooling the drive beam, a heat sink located near the anchor point causes the drive beam to cool with a different temperature profile than it did upon heating, and therefore the cantilever deflects along a different trajectory upon cooling than it did upon heating.

Embodiments of the MEMS device are described, which include a MEMS thermal actuator that may extend in two orthogonal directions by having at least two segments disposed orthogonally to each other. Each segment bends about a different point. Therefore, the MEMS hysteretic thermal actuator may have articulated motion, and be capable of moving in two substantially different directions.

Furthermore, the MEMS segmented thermal actuator may move along one trajectory while heating up, but may move in a second, substantially different trajectory while cooling down. In other words, the motion of the segmented thermal actuator may be hysteretic during the heating phase compared to the cooling phase. The segmented, hysteretic thermal actuator may therefore be used to close and latch an electrical switch, for example, as well as in any of a number of different applications, such as valves or pistons, which may require articulated, hysteretic motion.

Several embodiments of the MEMS segmented, hysteretic thermal actuator are disclosed. In a first embodiment, two substantially different directions of motion are achieved by including a substantially ninety-degree bend between two segments of a cool beam of the thermal actuator. A current-carrying element provides a hot driving beam, which expands relative to the cool beam. The current-carrying element is disposed adjacent to the two segments of the cool beam and heats up as current is driven through it. The current-carrying element expands upon heating, driving the first segment of the cool beam in one direction before the substantially ninety-degree bend, and driving the second segment of the cool beam in another direction after the substantially ninety-degree bend. Because the temperature profile of the beam depends on whether the beam is being heated or cooled, the beam moves differently upon heating than it does upon cooling, and therefore the motion is hysteretic.

In another exemplary embodiment, the MEMS segmented, hysteretic device consists of two segments and a rigid link joining the first segment to the second segment in an approximately rectilinear fashion. Upon heating an adjacent hot driving beam, the hot driving beam bends the first segment about its anchor point. Upon further heating, the hot driving beam bends the second segment about the rigid link. Upon cooling, the bending of the first segment about the anchor point relaxes before the second segment about the rigid link. Therefore, the motion of the MEMS segmented actuator is hysteretic, being different upon heating than upon cooling.

In yet another exemplary embodiment, the segments of the MEMS segmented, hysteretic device are oriented to move in two substantially different planes. A flexure joins the two segments. A driving beam is a circuit which is disposed adjacent to the segments, such that the driving beam drives the device in two different planes of motion, one about the anchor point and the other about the flexure.

These and other features and advantages are described in, or are apparent from, the following detailed description.

BRIEF DESCRIPTION OF THE DRAWINGS

Various exemplary details are described with reference to the accompanying drawings, which however, should not be taken to limit the invention to the specific embodiments shown but are for explanation and understanding only.

FIGS. 20-27 illustrate steps in an exemplary fabrication method for the ninth exemplary MEMS hysteretic actuator.

DETAILED DESCRIPTION

Although the systems and methods described herein are applied to an electrical switch, it should be understood that this is only one embodiment, and that the systems and methods may be appropriate for any number of devices, such as valves, pistons and other devices using actuators.

A MEMS hysteretic device is described, which includes a cantilevered beam that extends from an anchor point in at least two orthogonal directions. The MEMS hysteretic device also includes a driving means coupled to the cantilever, wherein the driving means may include a drive beam coupled to the cantilever by at least one tether. Upon heating the drive beam, the drive beam expands to deform the cantilever. Upon cooling the drive beam, a heat sink located near the anchor point causes the drive beam to cool with a different temperature profile than it did upon heating, and therefore the cantilever deflects along a different trajectory upon cooling than it did upon heating.

Figure 3:
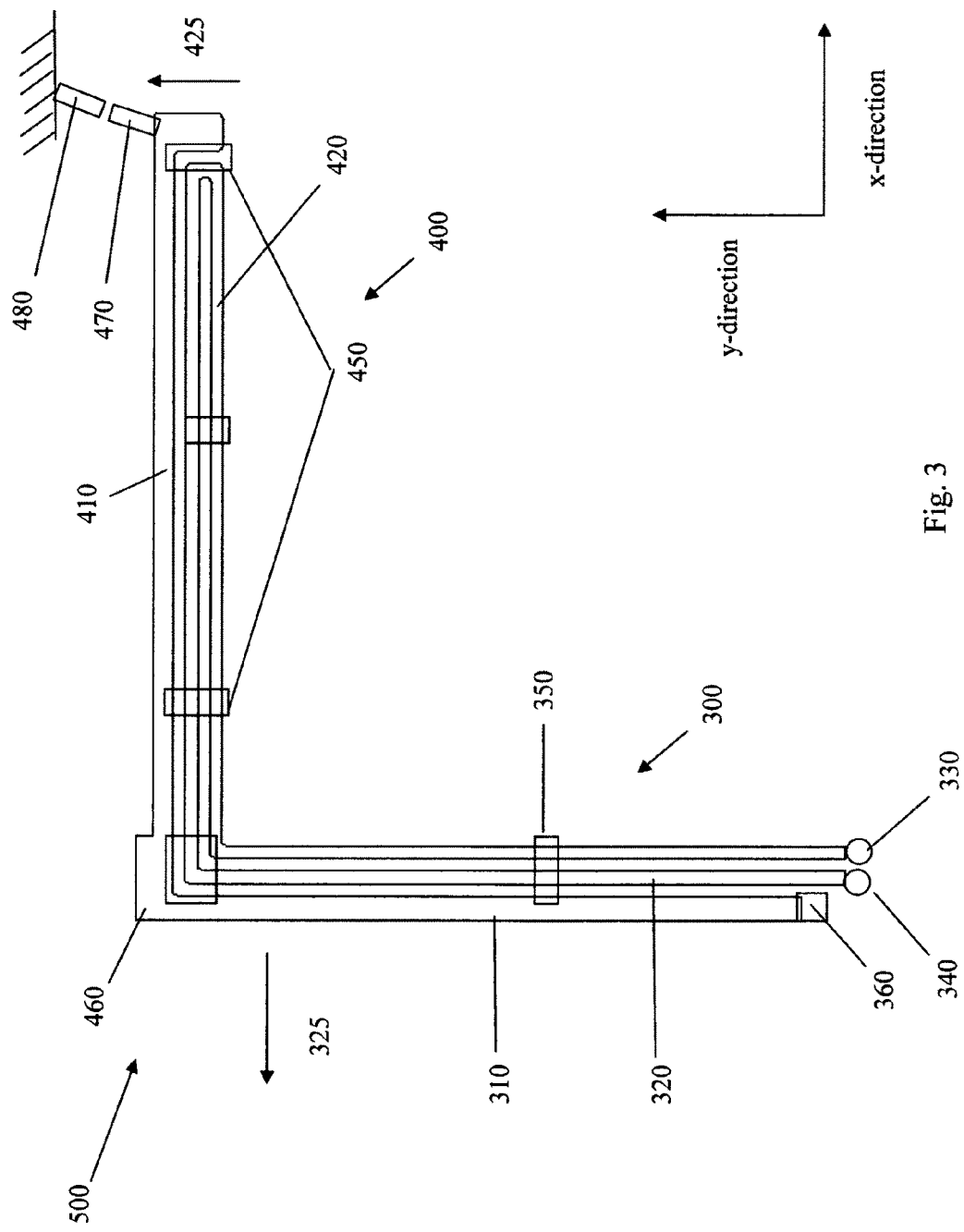
FIG. 3 is a diagram illustrating a first exemplary embodiment of a MEMS segmented thermal actuator.

FIG. 3 is a diagram illustrating a first exemplary embodiment of a MEMS hysteretic thermal actuator 500. MEMS hysteretic thermal actuator 500 includes two beam segments 300 and 400, which are joined at a substantially ninety-degree joint 460. The first segment 300 includes a first drive beam portion 320 disposed adjacent, and coupled to a first cool, passive beam portion 310. Similarly, the second segment 400 includes a second drive beam portion 420 disposed adjacent, and coupled to a second cool, passive beam portion 410. Current is input to the drive beam portions 320 and 420 at contacts 330 and 340, and the current circulating in the drive beam circuit heats portions 320 and 420 by joule heating. The drive beams 320 and 420 are mechanically coupled to the passive beam portions 310 and 410 by dielectric tethers 350 and 450, respectively. The dielectric tethers 350 and 450 may be made of any convenient, non-conducting material which couples the drive beam portions 320 and 420 to segmented passive beam portions 310 and 410 mechanically, but not electrically. In one embodiment, dielectric tethers 350 and 450 may be made from an epoxy-based photoresist such as SU-8, a negative photoresist developed by IBM of Armonk, N.Y.

The heat generated in the drive beam circuit flows out predominantly through the contacts 330 and 340, and to a lesser extent by radiation and convection to the closely spaced substrate, about 4 um from the drive beam circuit. Because heat is generated all along the drive beams 320 and 420, and flows out predominantly through the contacts 330 and 340 which act as heat sinks, the point in the drive beam circuit which is at the maximum temperature starts out being located adjacent to the ninety degree joint 460 or at a location approximately midway to the distal end of the drive beam 420. As the temperature continues to rise, however, the location of maximum temperature begins to move out along the drive beam circuit, away from contacts 330 and 340. If the duration of the current pulse is long enough, the point of maximum temperature will occur near the distal end of the drive circuit. The heat generated causes the first drive beam portion 320 and the second drive beam portion 420 to expand, which bends the first segment 300 in the negative x-direction 325 about the anchor point 360, and bends the second segment 400 in the positive y-direction 425 about the substantially ninety-degree joint 460.

When the current pulse ceases, the drive beam begins to cool. Since the dominant heat sink is located at the contacts 330 and 340, the first drive beam portion 320, located closer to the heat sink 330 and 340, cools faster than the second drive beam portion 420, which is located further from heat sinks 330 and 340. As a result, the first segment 300 of the MEMS hysteretic thermal actuator 500 relaxes before the second segment 400. Therefore, when the MEMS hysteretic thermal actuator 500 is heating, it bends in a trajectory that is different from the trajectory upon cooling, resulting in hysteretic behavior when the trajectory is plotted on a graph, as described below.

Figure 4:
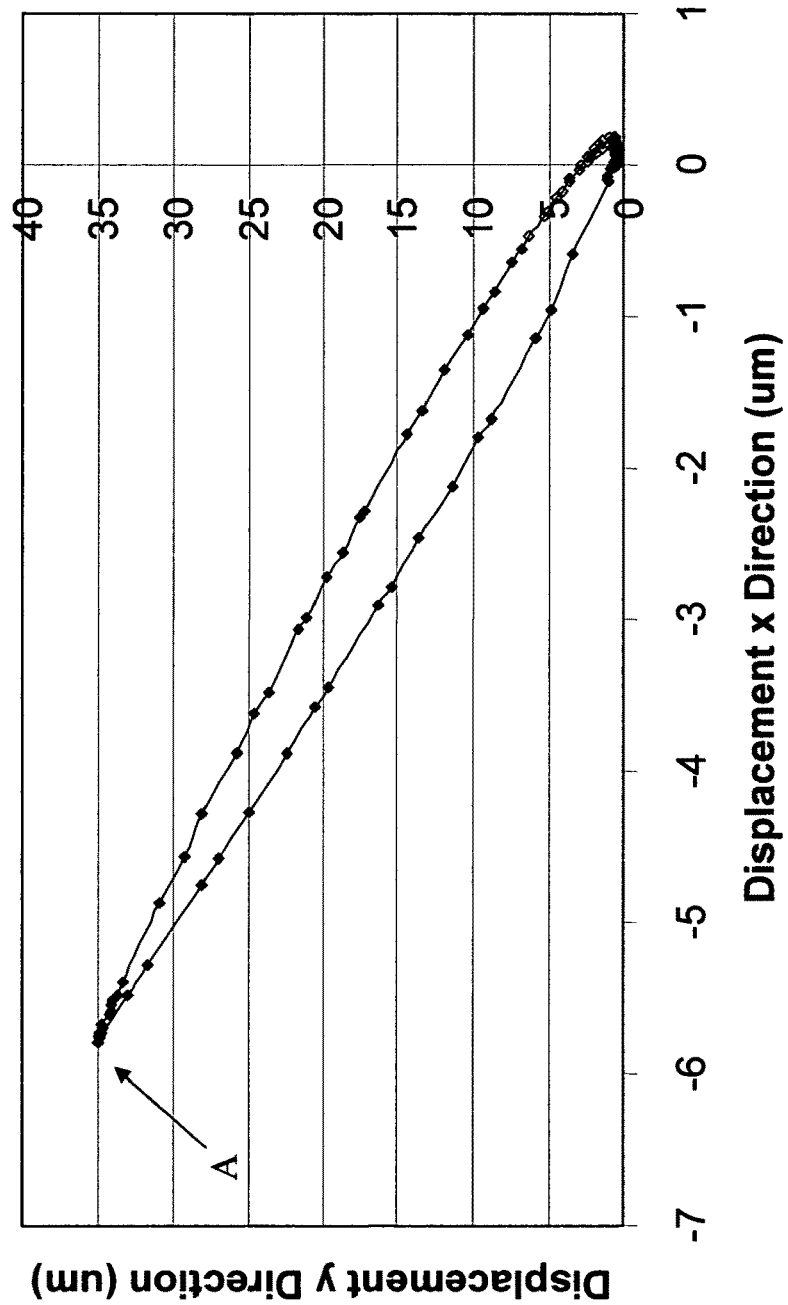
FIG. 4 is a plot of the results of a simulation predicting the behavior of the MEMS hysteretic thermal actuator of FIG. 3 in response to the application of a square wave current pulse.

FIG. 4 is a plot showing the results of a mathematical simulation using an ANSYS multi-physics finite element model, which simulates the deflection of the tip of the passive beam that results from the heating of the drive beam with a square wave current pulse. The current pulse used for FIG. 4 is 190 mA amplitude and 3 μsec duration. Each point in the plot corresponds to an equal increment of time. As shown in FIG. 4, the tip of the MEMS hysteretic thermal actuator 500 moves in the positive y-direction and the negative x-direction (the x- and y-axes are indicated in FIG. 3). The movement in the positive y-direction is accomplished largely by beam portion 400, and movement in the negative x-direction is accomplished largely by beam portion 300. The slope of the trajectory of the tip end is approximately −6, such that for every displacement of −1 μm in the negative x-direction, the y-displacement increases by about 6 μm. At the upper left of the displacement trajectory, at the point labeled A, the current pulse ceases, and the drive beam begins to cool. The cooling, as described above, relaxes the beam portion 300 first in the x-direction, followed by the beam portion 400 in the y-direction, so that the trajectory of the beams upon cooling is different than the trajectory of the beams upon heating. This is illustrated by the hysteresis seen in the curves shown in FIG. 4. The hysteresis is evident in the different slope of the upper trajectory compared to the lower trajectory. The slope of the upper trajectory is about 5.6 compared to the slope of about 6 for the lower trajectory. The nominal difference in the location of the tip end on the upper trajectory compared to the lower trajectory is on the order of about 5 μm for this current waveform. This hysteresis may be used to latch and unlatch the MEMS hysteretic actuator, when the actuator is used in a switch for example, as described further below.

Returning to FIG. 3, MEMS hysteretic thermal actuator 500 may be used to open and close an electrical switch. To implement this switch, MEMS hysteretic thermal actuator 500 is formed with a contact 470, which is adjacent to another contact 480 which is rigidly affixed to the substrate. The two contacts 470 and 480 may be made of different material than segmented beams 310, 320, 410 and 420. The contacts 470 and 480 may be made of a material which has a low contact resistance relative to the material of segmented beams 310, 320, 410 and 420. In one embodiment, the contacts 470 and 480 are gold, however, other materials such as gold-cobalt alloy, palladium, etc., may be used as well. In this embodiment, an electrical signal may flow from segmented beams 310 and 410 to contact 470 and then to contact 480 when the switch is closed. However, in another alternative embodiment described below with respect to FIGS. 19, 20a and 20b, the electrical signal may flow between two contacts located beyond the tip of segmented beam 410, rather than through segmented beam 410 to the contact.

Figure 1:
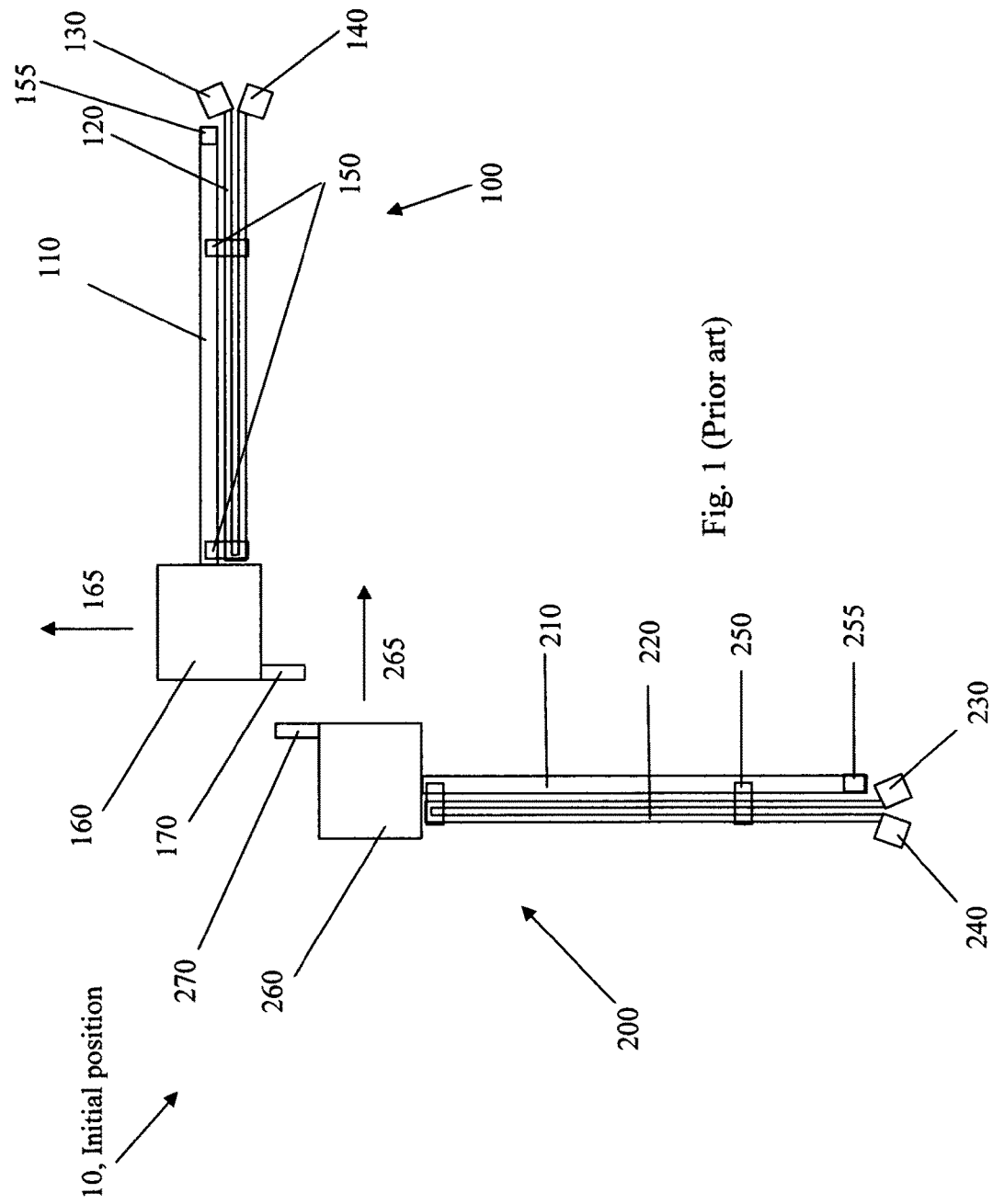
FIG. 1 is a schematic view of a prior art MEMS thermal switch.

In the quiescent state, the two contacts 470 and 480 of MEMS hysteretic thermal switch 500 may be located adjacent to each other, rather than one in front of the other as is the case with contact flanges 170 and 270 shown in FIG. 1.

Figure 2:
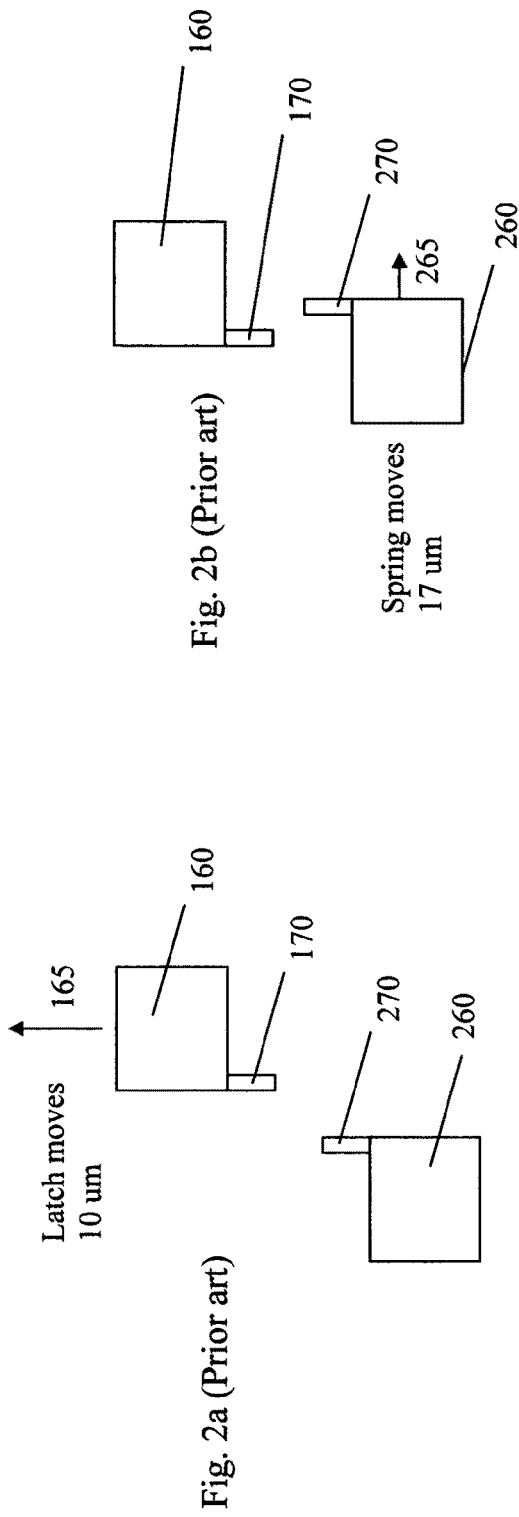
FIGS. 2a-2d are diagrams illustrating the sequence of movements required to close the switch illustrated in FIG. 1.

Because of the location of contacts 470 and 480 may be adjacent to one another, contact 470 does not need to be retracted as was shown in FIG. 2a Instead, the sequence of motion for the MEMS hysteretic thermal actuator 500 is shown as shown in FIG. 4, wherein upon energizing the drive beam, the tip of the cool beam moves up and to the left. Upon cessation of the drive current pulse, the cool beam relaxes on the upper trajectory shown in FIG. 4, whereupon it becomes engaged on contact 480, because it relaxes more quickly in the x-direction than the y-direction. The spring constant of the MEMS hysteretic thermal actuator 500 causes the switch to remain latched, because it exerts a normal force on the contact surfaces 470 and 480. The contact surfaces 470 and 480 remain engaged because of friction between the contact surfaces 470 and 480. Alternatively, the contact surfaces 470 and 480 may be shaped so that they remain engaged even without friction. Techniques and design considerations for such a switch are described in U.S. patent application Ser. No. 11/263,912, which is incorporated by reference in its entirety for all purposes.

To unlatch the MEMS hysteretic actuator 500, a square wave current pulse may again be applied to the drive beams 320 and 420. The unlatching current pulse may be of a lower amplitude and/or shorter duration than the latching current pulse. The resulting movement of the MEMS hysteretic thermal actuator releases the MEMS hysteretic thermal actuator from its engagement with contact 480. The restoring force of beam portion 400 may be designed to provide sufficient retraction of beam portion 400 to clear the engaging contact 480. The unlatch pulse may also be tailored in pulse shape, magnitude and duration to assure that MEMS hysteretic actuator 500 is released from the latched position.

Figure 5:
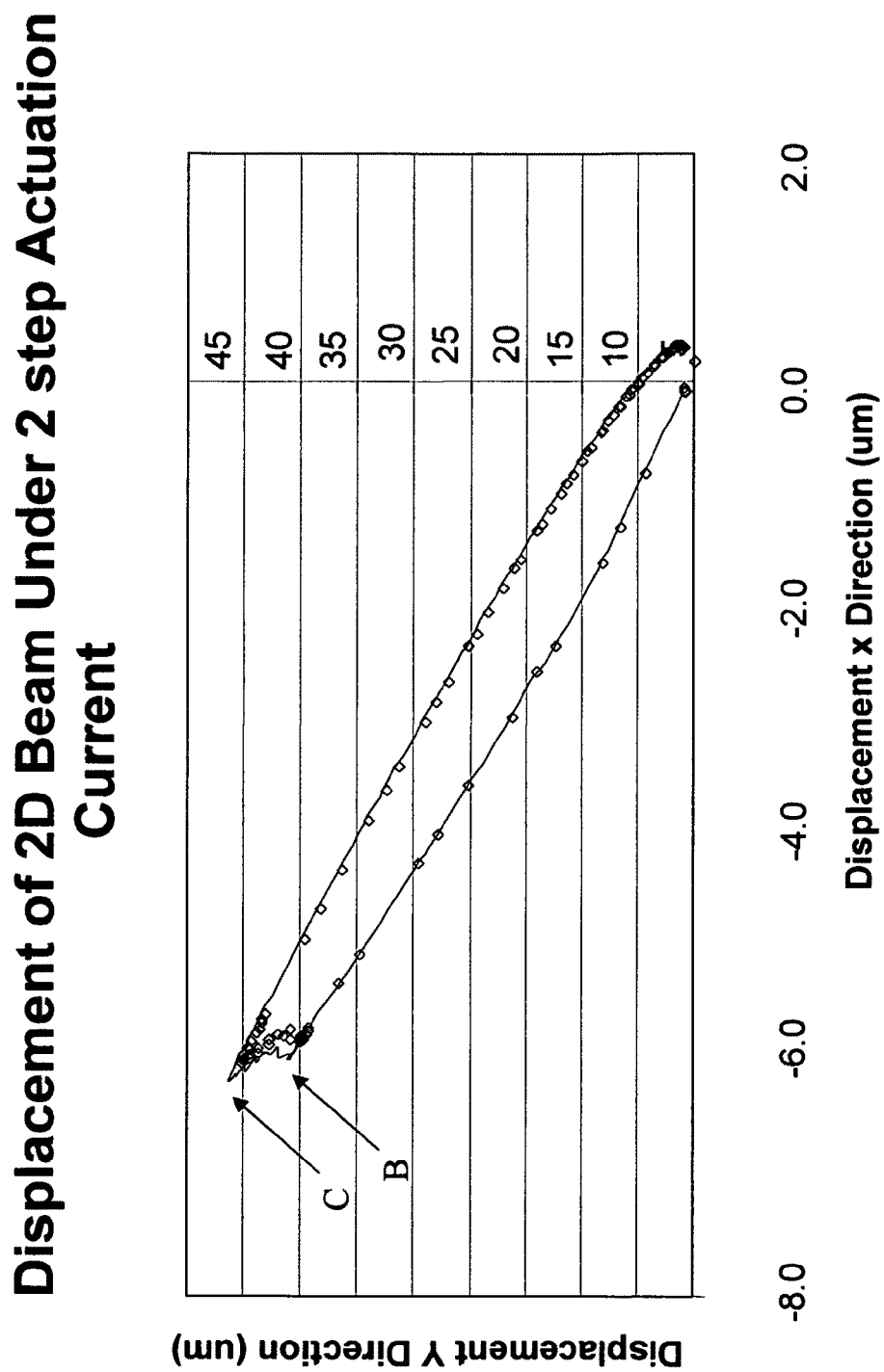
FIG. 5 is a plot of the results of a simulation predicting the behavior of the MEMS hysteretic thermal actuator of FIG. 3 in response to the application of a first square wave current pulse followed by another short current pulse.

The hysteresis shown in FIG. 4 may also be enhanced, if needed, by tailoring the shape of the current pulse applied to drive beams 320 and 420. For example, if the first 3 μsec, 190 mA current pulse is followed immediately by a second, lower current pulse of 160 mA for another 3 μsec, the trajectory of the tip of the MEMS hysteretic actuator 500 is as shown in FIG. 5. In FIG. 5, the second current pulse is applied at the point labeled B in the graph. The current ceases at the point labeled C in the graph, and the upper trajectory describes the relaxation of the MEMS hysteretic actuator 500. The result of the second current pulse is to hold the MEMS hysteretic thermal actuator 500 in approximately its deformed shape, while the additional heat provided by the additional current moves the point of maximum temperature from a location about ⅔ down the length of the MEMS hysteretic thermal actuator 500 to the tip end of the MEMS hysteretic thermal actuator 500. As a result, the hysteresis experienced by the cooling MEMS hysteretic thermal actuator 500 may be exaggerated, because the heat built up in the tip end of the MEMS hysteretic thermal actuator 500 takes longer to dissipate through the far-removed contacts 330 and 340.

Although FIG. 5 shows results for one particular example of a tailored pulse shape, it should be clear that a large number of alternative pulse shapes or pulse trains can be envisioned, such as a triangular, ramped or saw-toothed pulse shape, to accomplish other objectives with the MEMS hysteretic actuator 500, or enhance its performance in other ways.

Additional features of the MEMS hysteretic actuator 500 may be used to adjust the deflection of the MEMS hysteretic actuator 500. For example, areas in the passive beams 310 and 410 may be removed to form a flexible hinge, to enhance the deflection of the passive beams 310 and 410 about their respective anchor points. Design considerations and implementation of such features are described further in the incorporated '912 application.

Figure 6:
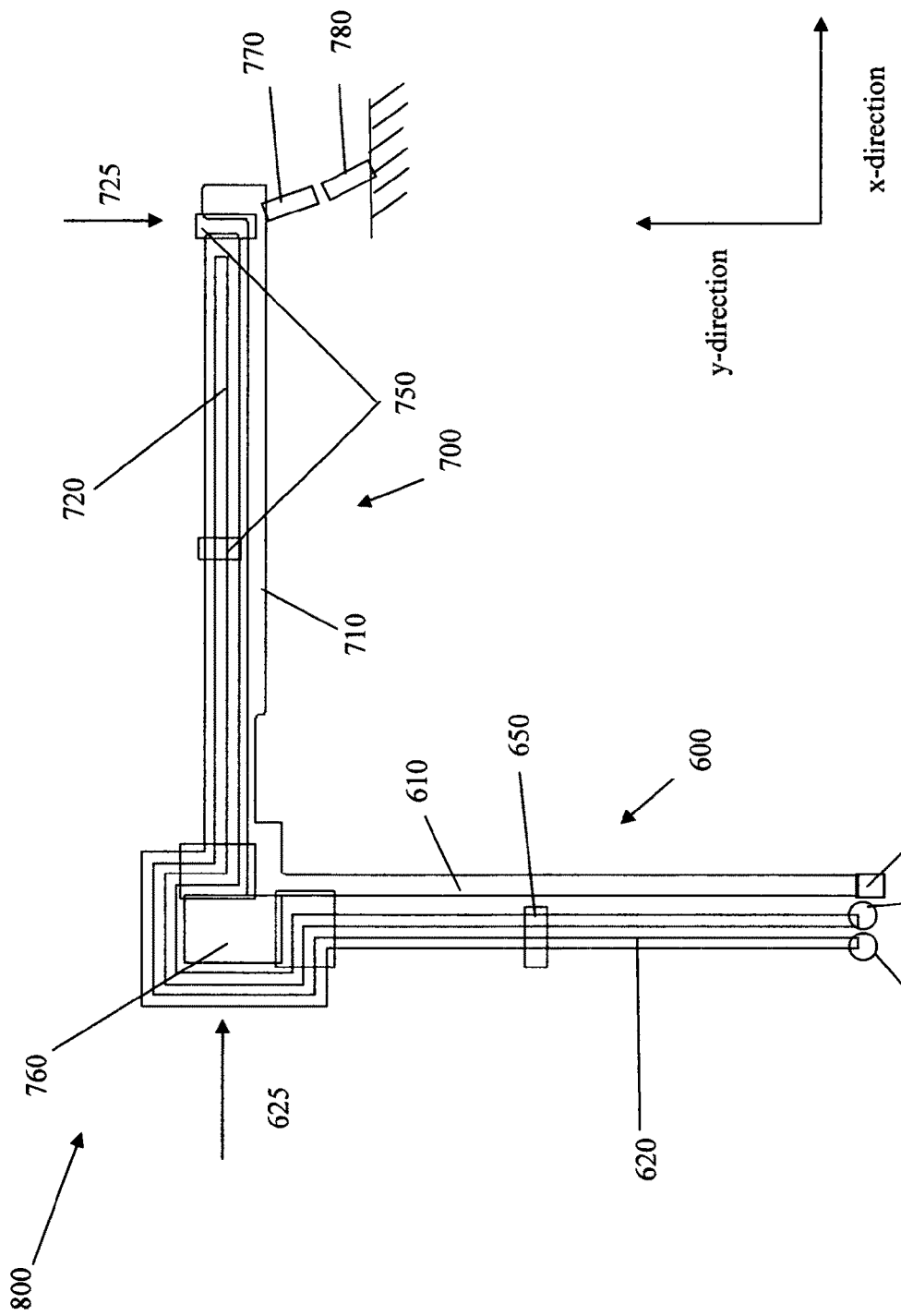
FIG. 6 is a diagram illustrating a second exemplary embodiment of a MEMS hysteretic thermal actuator.

FIG. 6 is a diagram illustrating a second exemplary embodiment of the MEMS hysteretic thermal actuator 800. In the second exemplary embodiment, as in the first exemplary embodiment, the MEMS hysteretic thermal actuator 800 includes two beam portions 600 and 700 coupled by a substantially ninety-degree joint 760. Beam portions 600 and 700 are coupled to pivot anchor 660 and joint 760, respectively. Each beam portion 600 and 700 includes a drive beam portion 620 and 720 and a cool beam portion 610 and 710. However, in the second exemplary embodiment, the drive beam portions 620 and 720 are disposed on the opposite side of passive beam portions 610 and 710, compared to the first exemplary embodiment. For this reason, MEMS hysteretic thermal actuator 800 bends in an opposite sense to MEMS hysteretic thermal actuator 500, as drive beam portion 620 tends to bend passive beam portion 610 in the positive x-direction 625 rather than the negative x-direction. Similarly, drive beam portion 720 tends to bend passive beam portion 710 in the negative y-direction 725 rather than the positive y-direction. Upon cooling, because of its proximity to the heat sink of contacts 630 and 640, the drive beam 620 cools more rapidly than drive beam 720, resulting in hysteretic behavior of the MEMS hysteretic actuator 800. Therefore, the behavior of this MEMS hysteretic actuator 800, if plotted on a graph similar to FIGS. 4 and 5, would show the inverse behavior. The tip end of the MEMS hysteretic thermal actuator would therefore be driven to the lower right of FIG. 6. Accordingly, to make an electrical switch using MEMS hysteretic thermal actuator 800, the contacts 770 and 780 would be placed as shown in FIG. 6.

Figure 7:
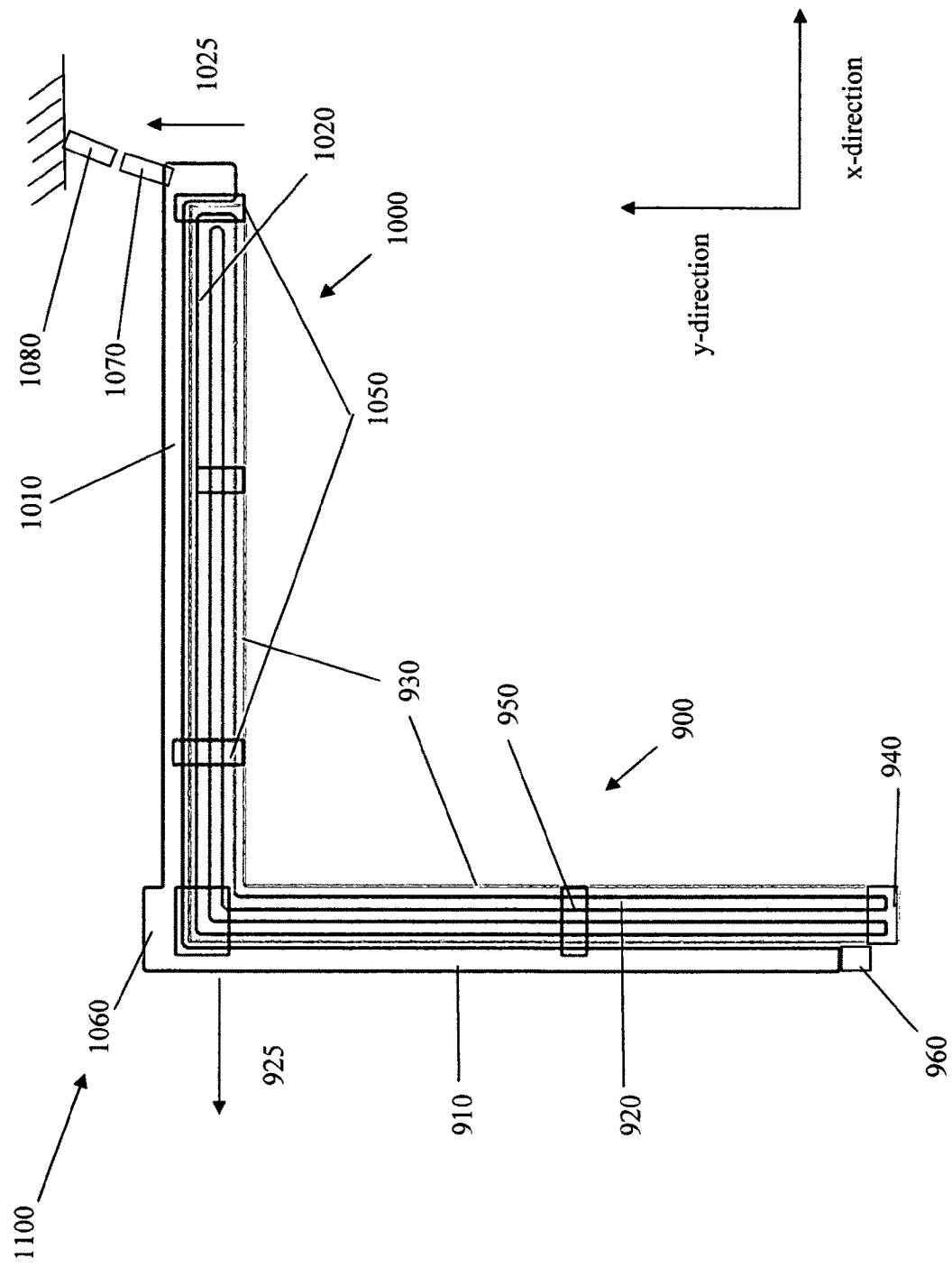
FIG. 7 is a diagram illustrating a third exemplary embodiment of a MEMS hysteretic thermal actuator, in which a heater element is disposed adjacent to the drive beams.

FIG. 7 is a diagram illustrating a third exemplary embodiment of the MEMS hysteretic actuator 1100. As with the previous embodiments, the MEMS hysteretic thermal actuator 1100 includes two beam portions 900 and 1000 coupled by a substantially ninety-degree joint 1060. Each beam portion 900 and 1000 includes a drive beam portion 920 and 1020 and a passive beam portion 910 and 1010. Drive beam portions 920 and 1020 may be coupled to passive beam portions 910 and 1010 by tethers 950 and 1050, respectively. Tethers 950 and 1050 may be thermally insulating, though not necessarily electrically insulating.

In the second exemplary embodiment, the drive beam portions 920 and 1020 are disposed adjacent to a heater element 930, which supplies heat to the drive beam portions 920 and 1020. The heater element also has a heat sink 940 disposed at its base, which dissipates heat when the heater element 930 is disabled. The heater element 930 may include, for example, an electrical circuit arranged in a serpentine pattern within heater element 930. For simplicity of depiction, however, the electrical circuit is not shown in FIG. 7, and the heater element 930 is shown as a simple outline overlaying drive beam portions 920 and 1020. It should be understood, however, that the heater element 930 may generate heat in any of a number of other ways, for example, it may be an optically opaque element which absorbs incident light.

Upon becoming heated by the heater element 930, drive beam portions 920 and 1020 expand, driving passive beam portions 910 and 1010 in directions 925 and 1025, respectively. Upon cooling, because of its proximity to the heat sink 940 of heater element 930, the drive beam 920 cools more rapidly than drive beam 1020, resulting in hysteretic behavior of the MEMS hysteretic actuator 1100. Accordingly, the behavior of MEMS hysteretic thermal actuator 1100 is similar to that of MEMS hysteretic thermal actuator 500, and can be described qualitatively by the plots shown in FIGS. 4 and 5. A latching electrical switch may be made using MEMS hysteretic actuator 1100, by disposing contacts 1070 and 1080 as shown in FIG. 7.

Figure 8:
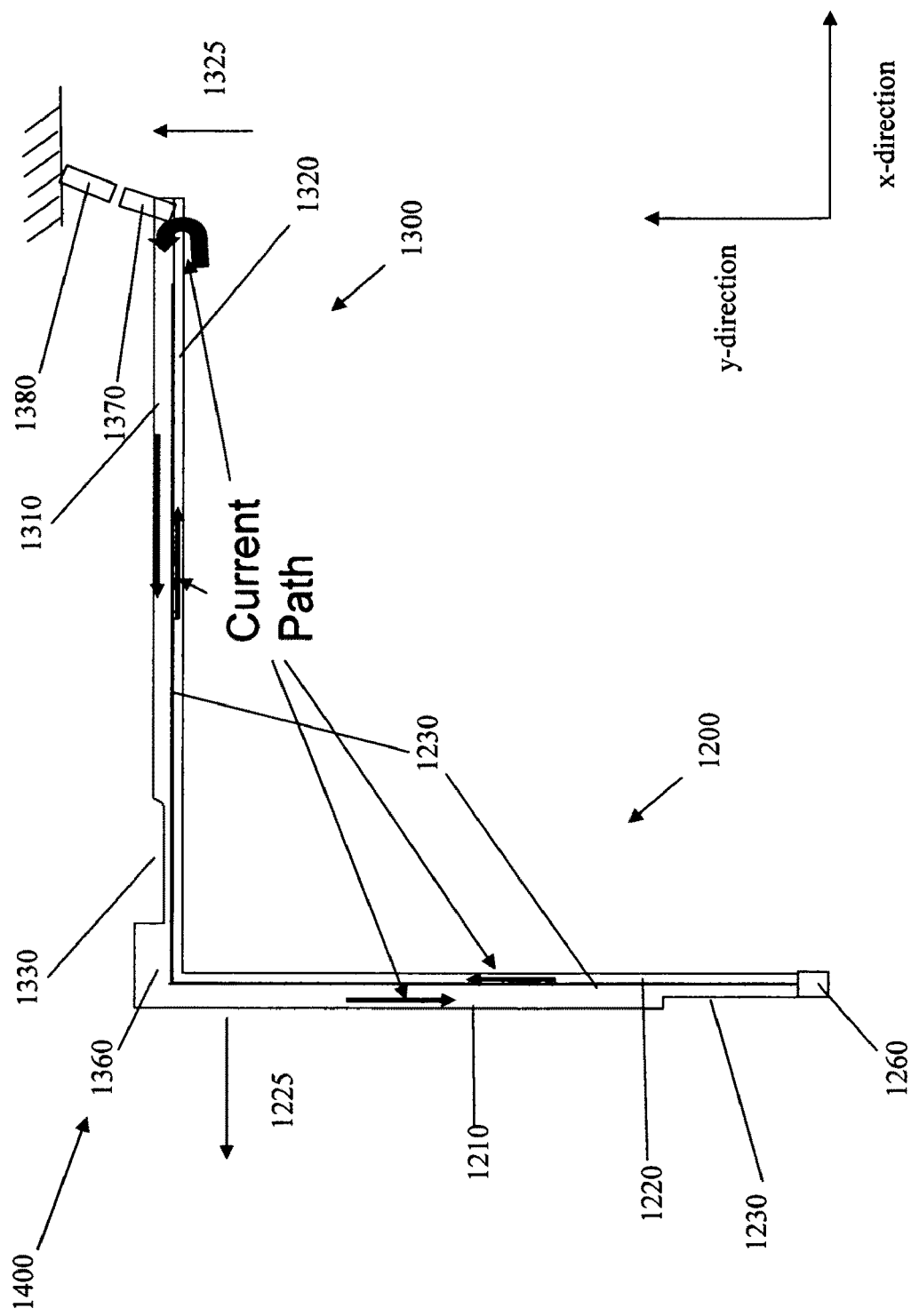
FIG. 8 is a diagram illustrating a fourth exemplary embodiment of a MEMS hysteretic thermal actuator, in which current flows through and heats a high coefficient of thermal expansion material along with a low coefficient of thermal expansion material.

FIG. 8 is a diagram illustrating a fourth exemplary embodiment of MEMS hysteretic actuator 1400. As with the previous embodiments, the MEMS hysteretic thermal actuator 1400 includes two beam portions 1200 and 1300 coupled by a substantially ninety-degree joint 1360. Each beam portion 1200 and 1300 includes a drive beam portion 1220 and 1320 and a passive beam portion 1210 and 1310. The drive beam portions 1220 and 1320 are separated from the passive beam portions 1210 and 1310 by a dielectric barrier 1230 which extends out toward the end region of the second beam portion 1300, but ends before the edge of second beam portion 1300. The flexibility of the two segments 1200 and 1300 to bending about the anchor point 1260 and rigid link 1360, respectively, may be adjusted by removing an area of material 1230 and 1330, near their pivot points, which causes segments 1200 and 1300 to pivot more easily about these points.

The drive beam portions 1220 and 1320 may be formed of a material having a higher coefficient of thermal expansion (CTE), relative to passive beam portions 1210 and 1310, which are formed of a material having a lower coefficient of thermal expansion. However, all of beam portions 1220, 1320, 1210 and 1310 are electrically conductive. A current is driven through drive beam portions 1220 and 1320 to the end of the second beam portion 1300, whereupon the current reverses direction and flows out through passive beam portion 1310 and 1210. The current causes joule heating in both beam portions 1200 and 1300. However, because drive beam portions 1220 and 1320 are formed from a material having a higher coefficient of thermal expansion relative to passive beam portions 1210 and 1310, drive beam portions expand relative to passive beam portions 1210 and 1310. Accordingly, drive beam portions 1220 and 1320 bend the passive beam portions 1210 and 1310 about anchor point 1260 and substantially ninety-degree joint 1360, respectively. Upon cooling, because of its proximity to the heat sink of anchor point 1260, the drive beam 1220 cools more rapidly than drive beam 1320, resulting in hysteretic behavior of the MEMS hysteretic actuator 1400. Accordingly, the behavior of MEMS hysteretic thermal actuator 1400 is similar to that of MEMS hysteretic thermal actuator 500, and can be described by plots similar to those shown in FIGS. 4 and 5. A latching electrical switch may be made using MEMS hysteretic actuator 1400, by disposing contacts 1370 and 1380 as shown in FIG. 8.

Figure 9:
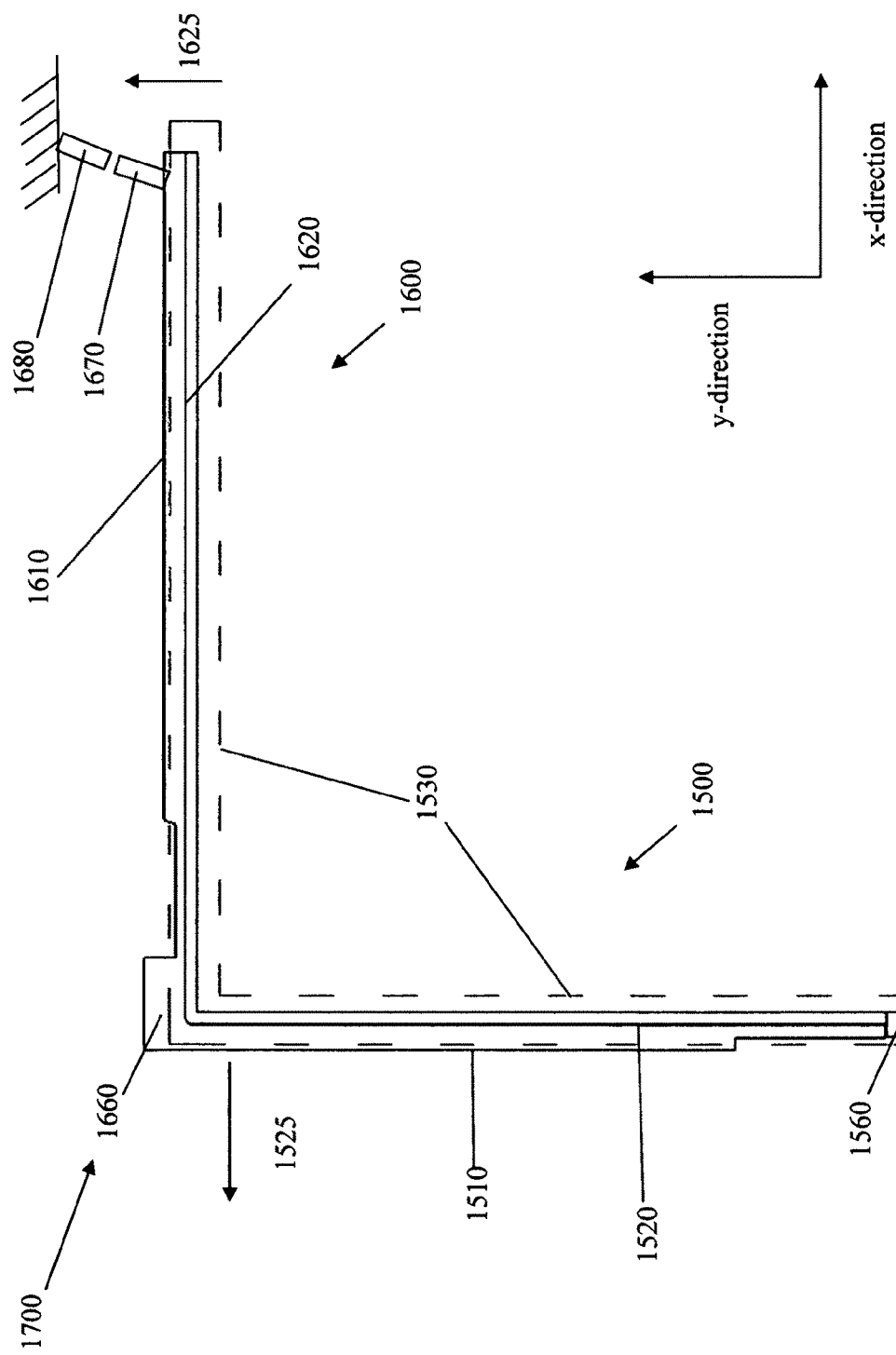
FIG. 9 is a diagram illustrating a fifth exemplary embodiment of a MEMS hysteretic thermal actuator, in which a heater is disposed adjacent to a low coefficient of thermal expansion member and a high coefficient of thermal expansion member.

FIG. 9 is a diagram illustrating a fifth exemplary embodiment of MEMS hysteretic thermal actuator 1700. As with the previous embodiments, the MEMS hysteretic thermal actuator 1700 includes two beam portions 1500 and 1600 coupled by a substantially ninety-degree joint 1660. Each beam portion 1500 and 1600 includes a drive beam portion 1520 and 1620 and a passive beam portion 1510 and 1610. The fifth exemplary embodiment is also similar to the fourth exemplary embodiment, in that the drive beam portions 1520 and 1620 are formed from a material having a higher coefficient of thermal expansion, and the passive beam portions 1510 and 1610 are formed from a material having a lower coefficient of thermal expansion. However, in the fifth exemplary embodiment, beam portions 1510, 1520, 1610 and 1620 need not be electrically conductive, because heat is supplied by a heater element 1530. Heater element 1530 may be a conductive circuit with wires formed in a serpentine pattern, or may be any other device capable of generating heat. The heat generated by heater element 1530 is absorbed by drive beam portions 1520 and 1620, as well as passive beam portions 1520 and 1610. However, because drive beam portions 1520 and 1620 are formed from a material having a higher coefficient of thermal expansion relative to passive beam portions 1510 and 1610, drive beam portions expand relative to passive beam portions 1510 and 1610. Accordingly, drive beam portions 1520 and 1620 bend the passive beam portions 1510 and 1610 about anchor point 1560 and substantially ninety-degree joint 1660, respectively. Upon cooling, because of its proximity to the heat sink of the anchor point 1560, the drive beam 1520 cools more rapidly than drive beam 1620, resulting in hysteretic behavior of the MEMS hysteretic actuator 1700. Accordingly, the behavior of MEMS hysteretic thermal actuator 1700 is similar to that of MEMS hysteretic thermal actuator 500, and can be described by plots similar to those shown in FIGS. 4 and 5. A latching electrical switch may be made using MEMS hysteretic actuator 1700, by disposing contacts 1670 and 1680 as shown in FIG. 9.

Figure 10:
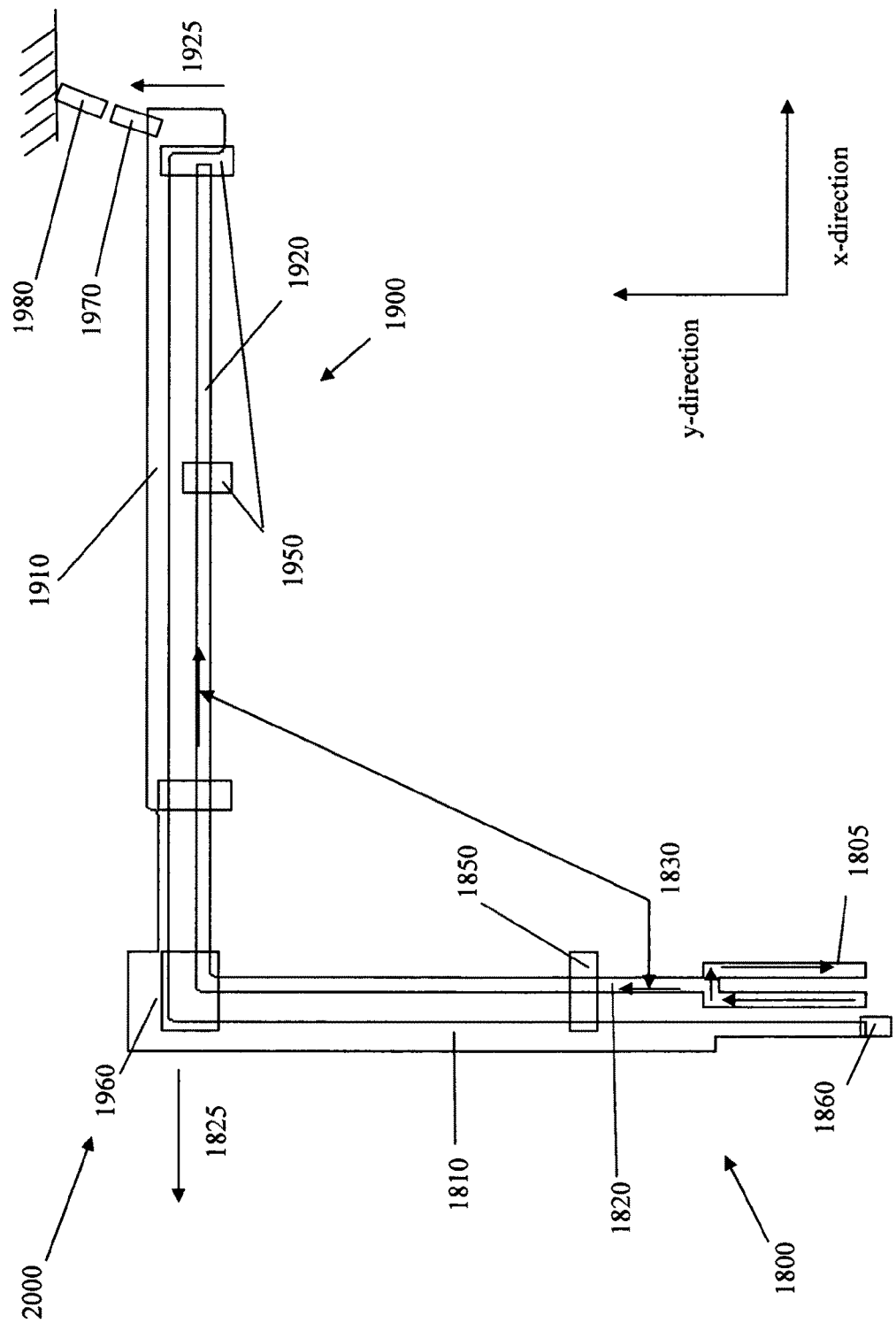
FIG. 10 is a diagram illustrating a sixth exemplary embodiment of a MEMS hysteretic thermal actuator, in which a heat source is disposed at the base of a heat conductor which conducts the heat to the tip of the thermal actuator.

FIG. 10 is a diagram illustrating a sixth exemplary embodiment of the MEMS hysteretic thermal actuator 2000. Like the previous embodiments, MEMS hysteretic thermal actuator 2000 includes two beam portions 1800 and 1900 coupled by a substantially ninety-degree joint 1960. Each beam portion 1800 and 1900 includes a drive beam portion 1820 and 1920 and a passive beam portion 1810 and 1910, which are coupled by tethers 1850 and 1950, respectively. The drive beam portions 1820 and 1920 are formed from stiff, thermally conductive materials. Drive beam portion 1820 is in thermal communication with a circuit 1805, which generates heat at the base of the drive beam portion 1820. The heat generated by circuit 1805 is conducted by thermally conductive drive beam portion 1820 to thermally conductive drive beam portion 1920, causing drive beam portions 1820 and 1920 to heat up. Accordingly, the drive beam portions 1820 and 1920 are required to be thermally conductive, but may not be electrically conductive.

The heating of drive beam members 1820 and 1920 causes drive beam portions 1820 and 1920 to expand. The expansion of drive beam portion 1820 causes driven beam 1810 to bend about anchor point 1860 in the negative x-direction 1825. Similarly, the expansion of drive beam portion 1920 causes driven beam portion 1910 to bend about substantially ninety-degree joint 1960 in the positive y-direction 1925. Upon cooling, because of its proximity to the heat sink of electrical circuit 1805, the drive beam 1820 cools more rapidly than drive beam 1920, resulting in hysteretic behavior of the MEMS hysteretic actuator 2000. Accordingly, the behavior of MEMS hysteretic thermal actuator 2000 may be similar to that of MEMS hysteretic thermal actuator 500, and may be described by plots similar to those shown in FIGS. 4 and 5. A latching electrical switch may be made using MEMS hysteretic actuator 2000, by disposing contacts 1970 and 1980 as shown in FIG. 10.

Figure 11:
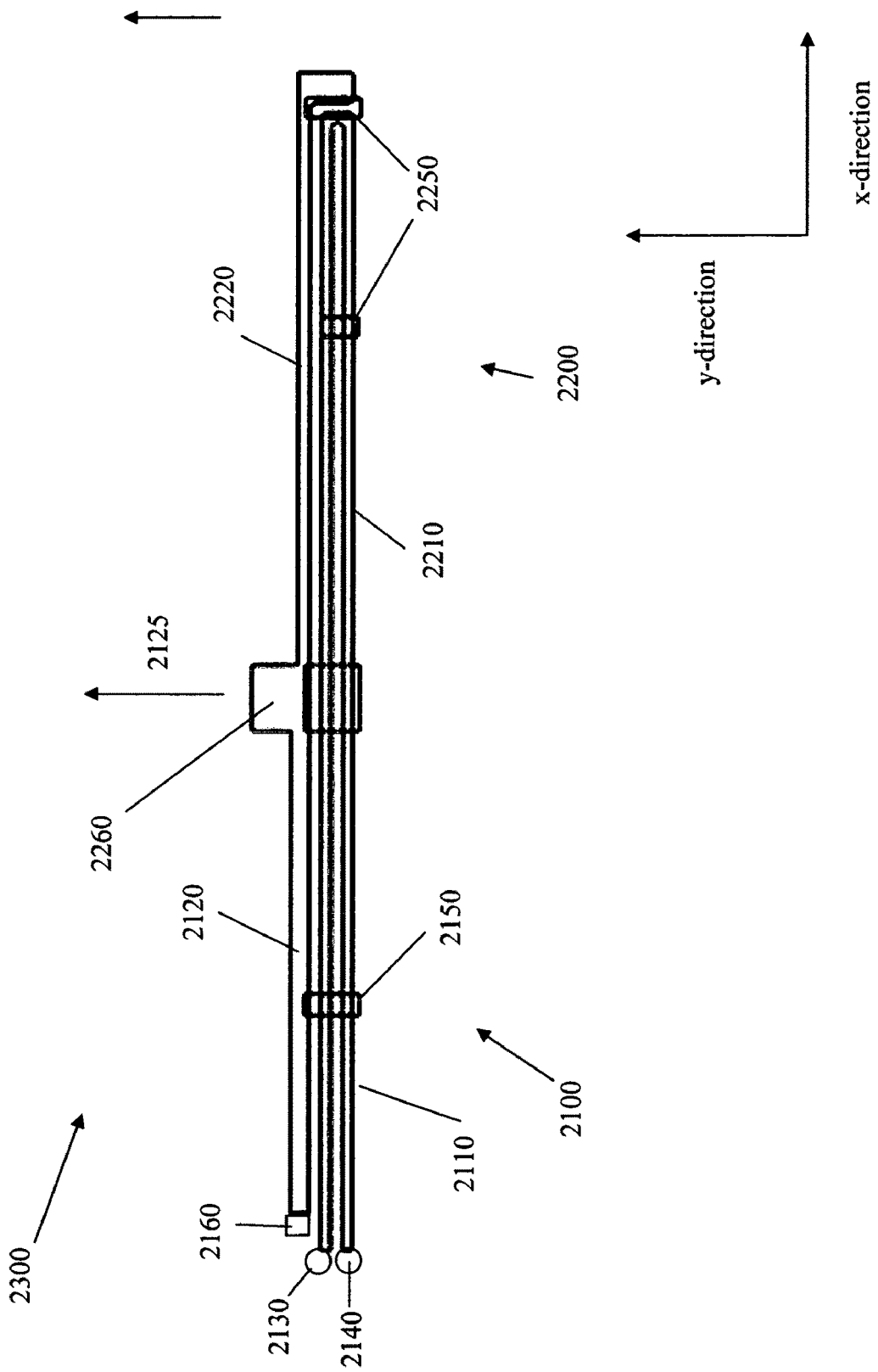
FIG. 11 is a diagram illustrating a seventh exemplary embodiment of a MEMS hysteretic thermal actuator, in which a first segment is coupled to a second segment by a rectilinear rigid link.

FIG. 11 is a diagram of a seventh exemplary embodiment of a MEMS hysteretic thermal actuator 2300. Like the previous embodiments, MEMS hysteretic thermal actuator 2300 includes two beam portions 2100 and 2200 coupled by a rigid link 2260. However, in this embodiment, the rigid link 2260 does not join the two beam portions 2100 and 2200 at a substantially ninety-degree angle. Instead, rigid link 2260 joins beam portion 2100 and 2100 in a rectilinear fashion. Rigid link 2260 provides a distinct pivot point for beam portion 2200 compared to beam portion 2100, which may pivot about anchor point 2160. Accordingly, the presence of rigid link 2260 allows MEMS hysteretic actuator 2300 to move in two substantially different directions, with at least about a five degree angle between these directions. Each beam portion 2100 and 2200 includes a drive beam portion 2120 and 2220 and a passive beam portion 2110 and 2210, which are coupled by tethers 2150 and 2250, respectively.

Heat is generated in drive beam portions 2120 and 2220 by applying a voltage between contacts 2130 and 2140. Current flows in drive beam portions 2120 and 2220 as a result of the voltage, which heats drive beam portions 2120 and 2220 by joule heating. Drive beam portions 2120 and 2220 expand because of their increased temperature. Because drive beam portions 2120 and 2220 are tethered to passive beam portions 2110 and 2210 by tethers 2150 and 2250, the expansion causes passive beam portion 2110 to bend about anchor point 2160, and passive beam portion 2210 to bend about rigid link 2260. Upon cooling, the drive beam portion 2120 cools faster than drive beam portion 2220, because of its closer proximity to the heat sink of contacts 2130 and 2140. As a result, the motion of MEMS hysteretic thermal actuator 2300 is hysteretic, as the thermal profile of the MEMS hysteretic thermal actuator 2300 is different upon heating than it is upon cooling. By disposing contacts in the appropriate locations on MEMS hysteretic thermal actuator 2300, a latching electrical switch may be formed.

Although embodiments have been described wherein the first segment is joined to the second segment at an angle of about zero degrees (FIG. 11) and an angle of about ninety degrees (FIGS. 3 and 6-10), it should be understood that any other angle greater than or equal to about zero degrees and less than or equal to about ninety degrees may also be used in the MEMS hysteretic actuator.

Figure 12:
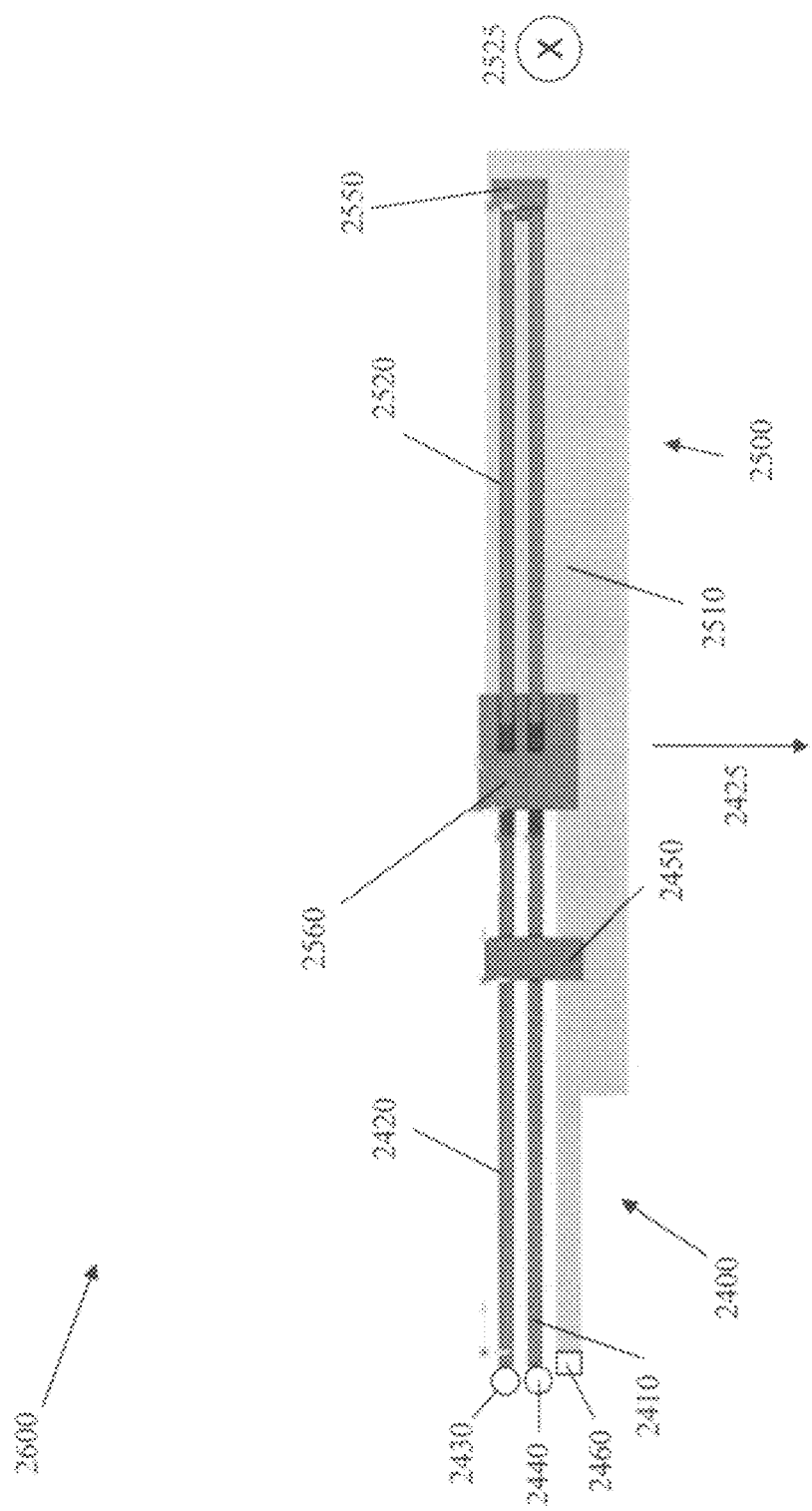
FIG. 12 is a side view of an eighth exemplary MEMS hysteretic thermal actuator, wherein the motion of a first segment is in one plane, and the motion of a second segment is in another, substantially orthogonal plane.
Figure 13:
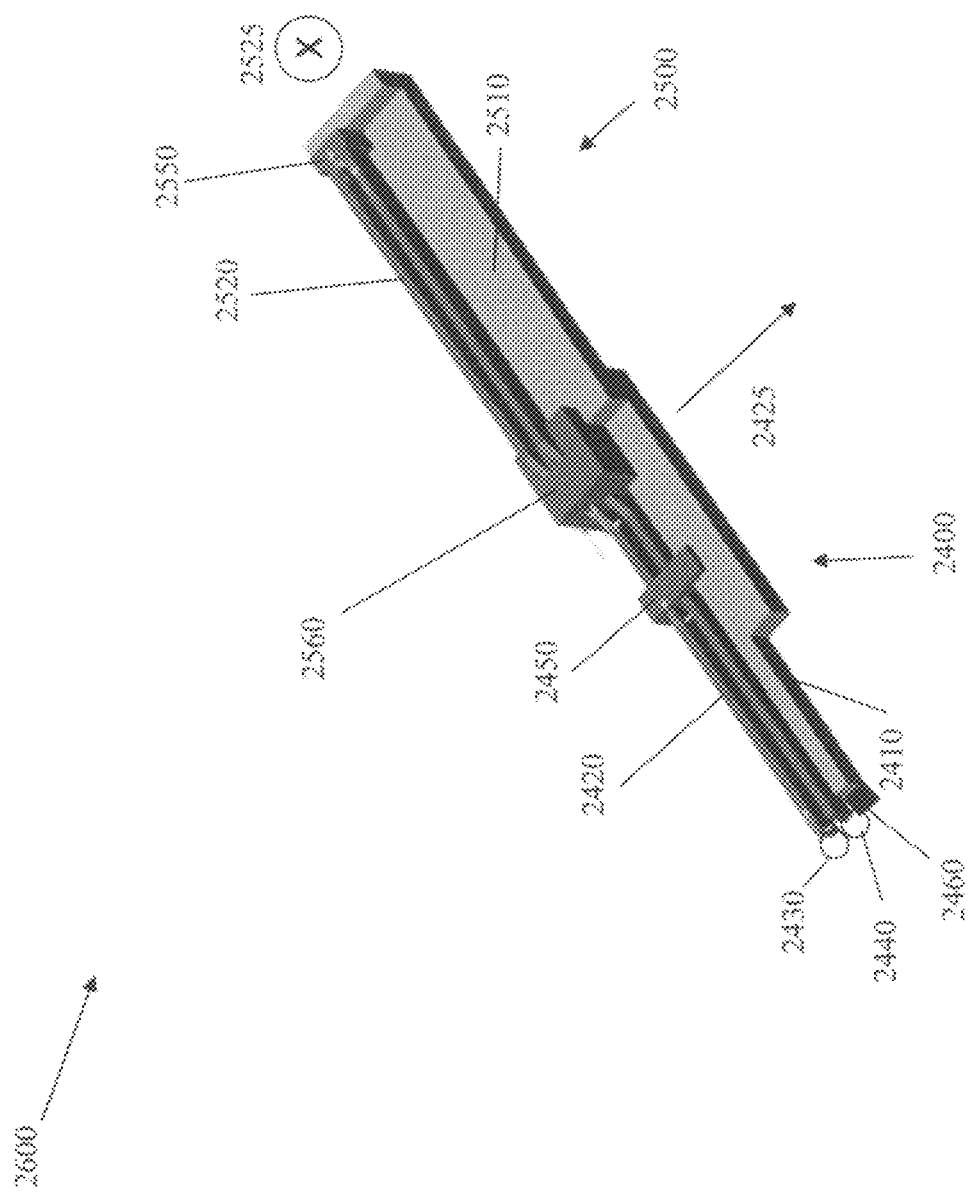
FIG. 13 is a perspective rendering of the MEMS hysteretic thermal actuator of FIG. 12.

FIG. 12 is a schematic side view of an eighth exemplary embodiment of a MEMS hysteretic thermal actuator 2600. Like the previous embodiments, MEMS hysteretic thermal actuator 2600 includes two beam portions 2400 and 2500 coupled by a rigid link 2560. Each beam portion 2400 and 2500 includes a drive beam portion 2420 and 2520 and a passive beam portion 2410 and 2510, which are coupled by tethers 2450 and 2550, respectively. However, in this embodiment, drive beam portions 2420 and 2520 are disposed such that they drive the driven beam portions 2410 and 2510 in two different planes. In particular, drive beam portion 2420 is oriented to bend passive beam portion 2410 about fixed anchor point 2460 in direction 2425, indicated in FIG. 12. Drive beam portion 2520 is oriented to bend passive beam portion 2510 about the rigid link 2560 in the direction 2525, which is into the paper as indicated in FIG. 12. Accordingly, MEMS hysteretic thermal actuator has one component bending in the plane of the paper, and another component bending in a plane orthogonal to the paper. Like the previous embodiments, current is input to drive beam portions 2420 and 2520 by applying a voltage between contacts 2430 and 2440. The current heats the drive beams by joule heating, and the resulting expansion of the drive beam portions 2420 and 2520 causes the bending of the passive beams 2410 and 2510 described above. The contacts 2430 and 2440 also provide a heat sink for the drive beam portions 2420 and 2520. Accordingly, drive beam portion 2420 located nearer to heat sink contacts 2430 and 2440 cools more quickly than drive beam portion 2520 located farther from heat sink contacts 2430 and 2440. Therefore, the motion of MEMS hysteretic thermal actuator 2600, like MEMS hysteretic thermal actuators 500-2300 is hysteretic between the heating phase and the cooling phase. FIG. 13 is a perspective view of the eighth exemplary embodiment described above.

One of the issues with the eighth exemplary embodiment of MEMS hysteretic thermal actuator 2600 is difficulty of manufacturing. As shown in FIG. 13, in the first segment 2400 of MEMS hysteretic thermal actuator 2600, the cantilevered drive beams 2420 are disposed adjacent to the passive beam portion 2410, whereas in the second portion 2500 of MEMS hysteretic thermal actuator 2600, the cantilevered drive beams 2420 are disposed above the passive beam portion 2510. Because of the orientations of the drive beam portions 2420 and 2520 with respect to the passive beam portions 2410 and 2510, the drive beam portions cannot be formed or deposited in a single step. This complicates the manufacturing process flow for making MEMS hysteretic thermal actuator 2600.

Figure 14:
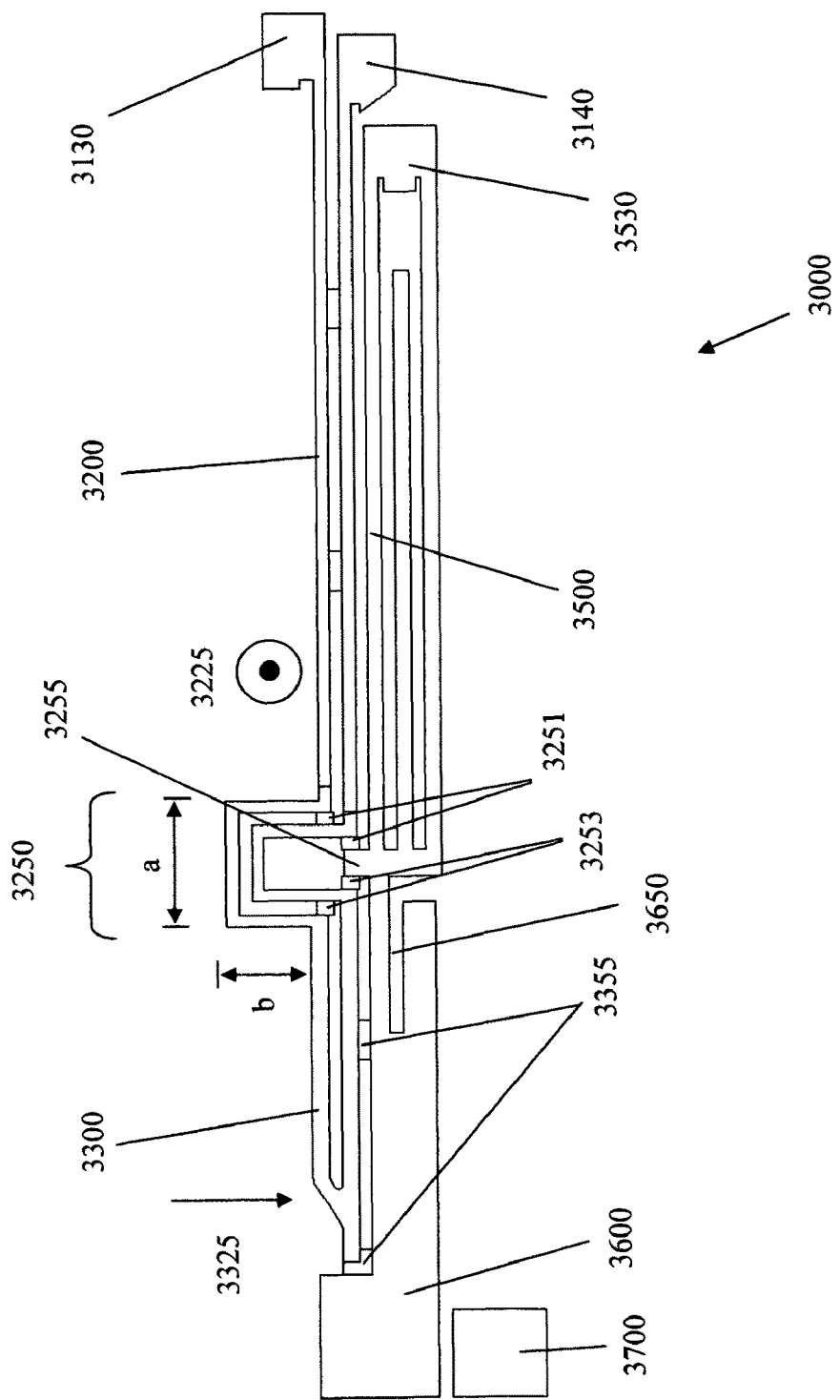
FIG. 14 is plan view of a ninth exemplary MEMS hysteretic thermal actuator, which moves in two substantially orthogonal planes.

FIG. 14 illustrates a ninth exemplary MEMS hysteretic thermal actuator 3000, which may be easier to manufacture than MEMS hysteretic thermal actuator 2600. MEMS thermal device 3000 is similar to hysteretic MEMS thermal device 2600, in that it is designed to move in two substantially orthogonal planes. In hysteretic MEMS thermal device 3000, the drive beam is separated into two segments, 3200 and 3300, which are separated by a flexure 3250. The flexure 3250 serves to decouple the motion in the two orthogonal planes, which motion is driven by a first segment 3200 and a second segment 3300. The first plane of motion is out of the plane of the paper, in direction 3225, as indicated in FIG. 14. This motion is produced by fabricating the cantilevered drive beam 3200 slightly below the plane of the passive beam segment 3500, relative to the substrate surface. That is, cantilevered drive beam 3200 is closer to the substrate surface than passive beam segment 3500. More generally, the driving beam segment 3200 may have an average elevation different than the average elevation of the passive beam segment 3500, wherein the average elevation is along the longitudinal axis of driving beam 3200. Accordingly, when cantilevered drive beam segment 3200 is heated by passing a current through cantilevered drive beam segment 3200 by applying a voltage to pads 3130 and 3140, it expands about the pads 3130 and 3140 anchored to the surface of the substrate. Because passive beam segment 3500 is not heated, it does not expand, so that cantilevered drive beam segment 3200 is forced to bend itself and passive beam segment 3500 upward, away from the substrate surface, about the anchor point 3530 of the passive beam segment 3500.

Then, the second segment 3300 of cantilevered drive beam begins to heat as the current is passes through it. It also expands as a result of the heat, and begins to move in direction 3325, bending passive beam segment 3600 in this direction. Cantilevered drive beam segment 3300 and passive beam segment 3600 move in direction 3325 because they are formed in the same plane, so that as cantilevered drive beam segment 3300 heats up, it bends toward the unheated passive beam segment 3600 in direction 3325. Accordingly, driving beam segment 3300 has an average elevation substantially the same as passive beam segment 3600.

At the joint between cantilevered drive beam segment 3200 and cantilevered drive beam segment 3300 is flexure 3250. The flexure 3250 consists of a length of the hot driving beam which bends away from and then back toward a knee 3255 in the passive beam, thus adding length to the hot driving beam. This additional length adds to the heat produced in the hot driving beam, by increasing its resistance. The amount of heat created within the flexure 3250 is larger than in the driving beam segments 3200 and 3300 because of the larger distance flexure 3250 is from the passive beam segments 3500 and 3600 which may act as radiative heat sinks. Therefore, the flexure 3250 acts as a heat choke, which impedes the flow of heat from the tip of the driving beam segment 3300 back to the anchor points 3130 and 3140, which act as the primary heat sink for the device. The presence of the flexure therefore enhances the hysteresis of the device, because heat built up in the tip of the driving beam segment 3300 has greater difficulty returning to the heat sink anchor point 3130 and 3140 than heat built up in the first driving beam segment 3200. It should be understood that additional lengths of driving beam may also be added to driving beam segment 3300 to increase the temperature at the distal end of MEMS hysteretic thermal actuator 3000, thus increasing the hysteresis of the actuator 3000.

In addition, flexure 3250 acts as a mechanical component to decouple the out-of-plane motion of the first beam segments 3200 and 3500, from the in-plane motion of the second beam segments 3300 and 3600. This function is provided primarily by the presence of dielectric spacers 3251 and 3253 between the driving beam segment 3200 and the knee 3255 of the passive segment 3500 and dielectric spacers 3355 between driving beam segment 3300 and passive segment 3600. Dielectric spacers 3253 act to transmit the out-of-plane torque produced by driving beam segment 3200 to passive beam segment 3500 by tethering the segments together at that point to bend the passive segment 3500 in direction 3225. Dielectric spacers 3251 act as an anchor for the bending of driving beam segment 3300 in direction 3325. The torque from driving beam segment 3300 is transmitted to the passive segment 3600 by dielectric spacers 3355, to bend the passive beam in direction 3325, at hinge flexure 3650.

In one exemplary embodiment, flexure 3250 may have a width a of about 48 μm and a height b of about 32 μm. The length of driving beam segment 3200 may be 270 μm, with a beam segment width of about 5 μm. The length of driving beam segment 3300 may be about 128 μm, so that the flexure 3250 is located about ⅔ of the distance between the anchor points 3130 and 3140 and the tip of driving beam segment 3300. However, it should be understood that these dimensions are exemplary only, and that other shapes and dimensions may be chosen depending on the requirements of the application. For example, the flexure 3250 may alternatively be located at about ⅓ or ½ of the distance between the anchor points 3130 and 3140 and the tip of the driving beam segment 3300.

Figure 15:
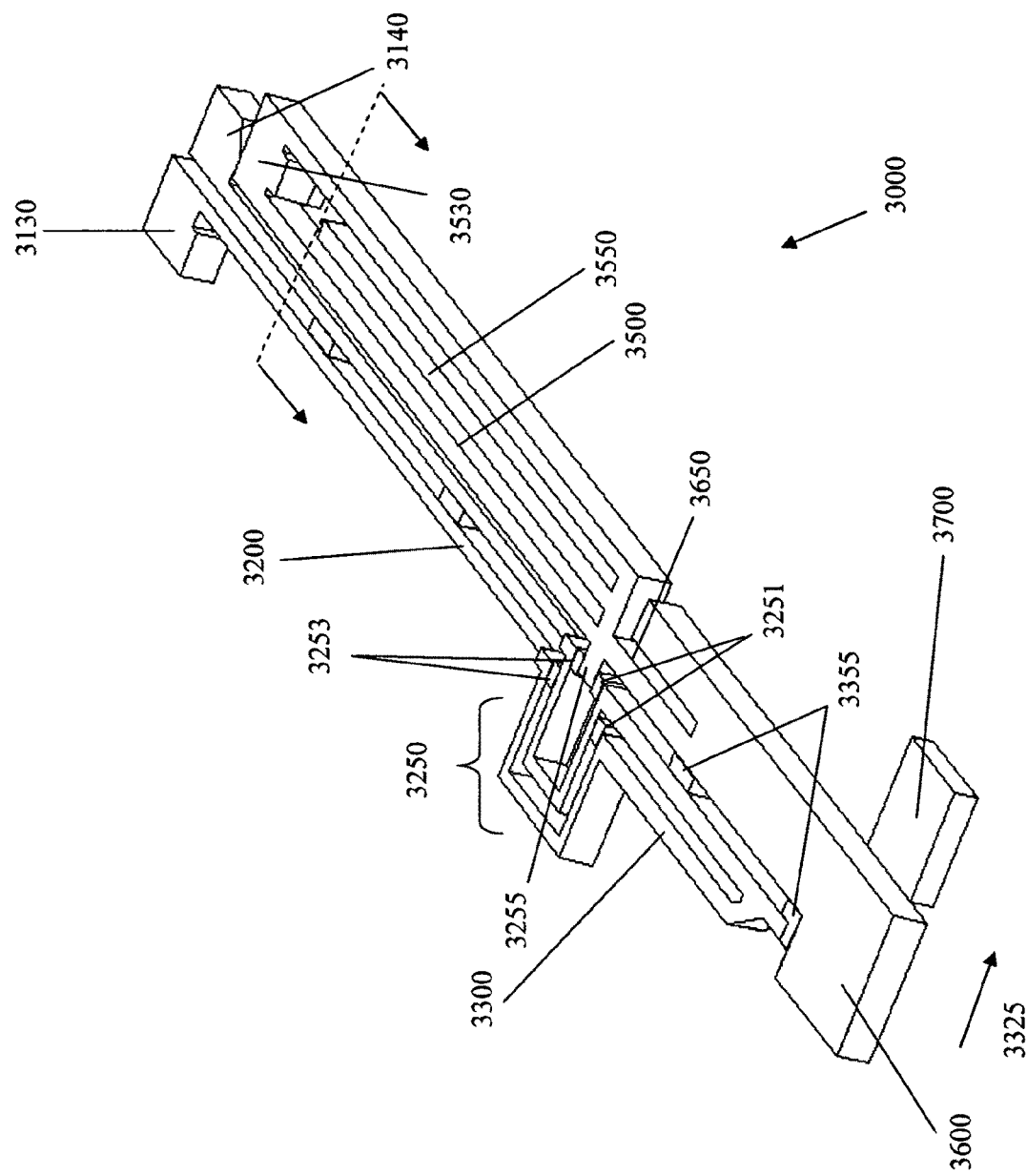
FIG. 15 is a perspective view of the ninth exemplary embodiment illustrated in FIG. 14.

FIG. 15 shows the ninth exemplary embodiment in perspective view, in which the construction of the ninth embodiment is more clearly evident. The first driving beam segment 3200 is fabricated on a lower plane than passive beam segment 3500. This allows the driving beam segment 3200 to bend the passive beam segment 3500 up and out of plane. In contrast, driving beam segment 3300 is in the same plane as passive segment 3600, in order to bend passive segment 3600 in the same plane as driving beam segment 3300. Thus, a step up occurs in the driving beam between driving beam segments 3200 and 3300. This step up may occur adjacent to dielectric tethers 3253, as the driving beam segment 3200 enters flexure region 3250. Accordingly, passive beam segments 3500 and 3600 may all be in the same plane, allowing the cool, passive beam segments 3500 and 3600 to be formed in a single process step, and simplifying manufacturing. Similarly, the driving beam segments 3200 and 3300 are all formed on the same side of passive beam segments 3500 and 3600, allowing the driving beams segments to be formed in a single deposition step, as described below.

Some additional features shown in FIG. 15 give the ninth exemplary embodiment several advantageous characteristics. First, passive beam segment 3600 has a relieved, hinged area 3650, which gives it additional flexibility to bend in direction 3325. Secondly, passive beam segment 3500 has a rectangular box shape. This gives passive beam segment 3500 a high moment of inertia in the in-plane direction but a low moment of inertia in the out of plane direction. This configuration enhances the ability of MEMS hysteretic thermal actuator 3000 to move out of plane rather than in-plane.

Additional structures, such as heat sink 3550 may be added to passive beam segment 3500 to assist with transferring heat through conduction, convection, and radiation away from passive beam segment 3500. The temperature difference between driving beam segment 3200 and passive beam segment 3500 may be proportional to the magnitude of out of plane movement that can be achieved. Heat may be transferred to passive beam segment 3500 from driving beam segment 3200 and the insulators 3253. Passive beam segment 3500 does not have a good thermal conduction path to anchor 3530 due to its thin width required to lower the out of plane stiffness. Additional heat sink 3550 may be added to increase the area of passive beam segment 3500 that can transmit heat without changing the stiffness. If more in-plane stiffness is required, heat sink 3550 can be designed to triangulate the box shape and increase the in-plane stiffness significantly more than the out of plane stiffness. These features thus enhance the ability of MEMS hysteretic thermal actuator 3000 to move out of plane rather than in-plane. Thus, the out-of-plane motion of passive beam segment 3500 is effectively decoupled from in-plane motion of passive beam segment 3600 by structures 3550 and 3650, as well as by flexure 3250.

The hysteretic effect in the ninth exemplary embodiment of MEMS hysteretic thermal actuator 3000 arises from the same effect as for MEMS hysteretic thermal actuators 500-2600. The hysteresis arises from the proximity of the primary heat sink to one of the segments of MEMS hysteretic thermal actuator 3000. This cools the segment nearest the heat sink faster than the segment further away from the heat sink, whereas during heating, the two segments are heated relatively uniformly. In the case of MEMS hysteretic thermal actuator 3000, both segments 3200 and 3300 are heated relatively uniformly, moving the tip 3600 diagonally away from the surface of the paper, up from the surface of the paper because of driving beam segment 3200 and downward in direction 3325 because of the action of driving beam segment 3300. However, upon cooling, driving beam segment 3200 cools faster than driving beam segment 3300, because of its closer proximity to heat sinking anchor points 3130 and 3140. MEMS hysteretic thermal actuator 3000 may therefore move back toward the substrate surface before relaxing back in the upward direction, opposite to direction 3325. Accordingly, because MEMS hysteretic thermal actuator moves through different points upon heating as it does upon cooling, MEMS hysteretic thermal actuator has a different trajectory upon activation, for example upon heating, than it does upon relaxation, for example upon cooling. For this reason, MEMS hysteretic thermal actuator 3000 may be used to rise up and over a stationary contact 3700, landing on the contact at the end of a latching pulse and remaining there because of frictional forces, or by forming a détente structure on the contact. The MEMS hysteretic thermal actuator 3000 may then be unlatched by applying a current pulse of appropriate amplitude and duration.

Figure 16:
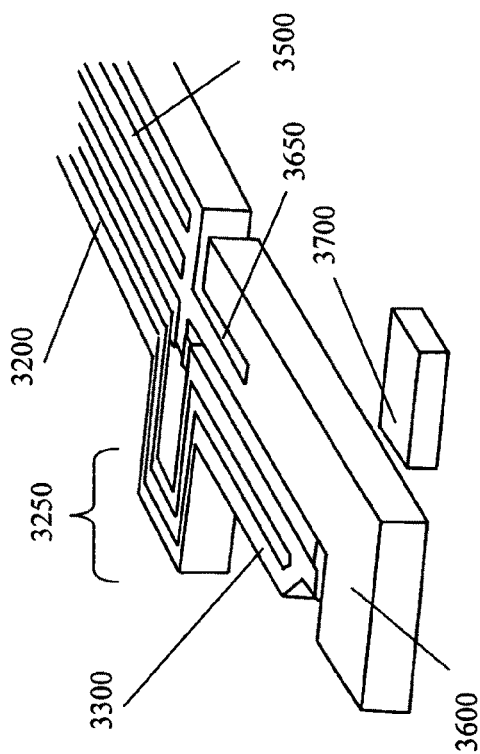
FIG. 16-19 illustrate the operation of the ninth exemplary MEMS hysteretic thermal actuator.
Figure 17:
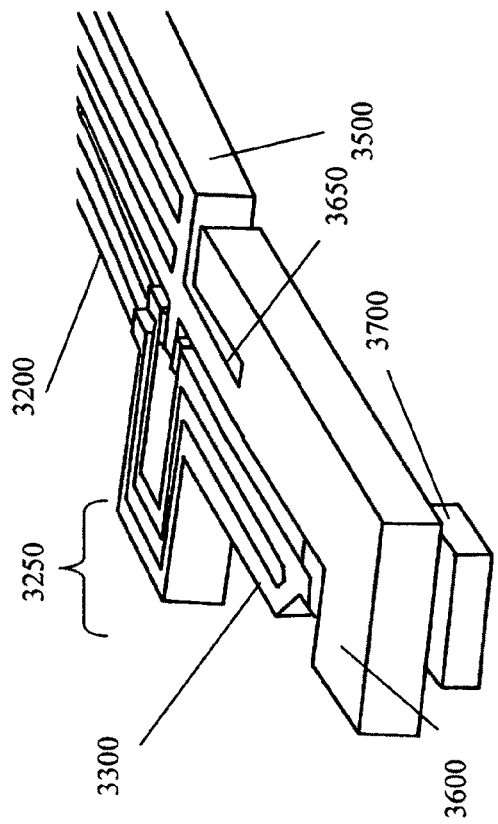

The ability of MEMS hysteretic thermal actuator 3000 to rise up and over a stationary contact 3700, is illustrated in FIGS. 16-19. FIG. 16 depicts MEMS hysteretic thermal actuator 3000 in its initial position, adjacent to a stationary contact 3700. By applying a voltage to anchor points 3130 and 3140, a current flows through driving beam segments 3200 and 3300, heating them by Joule heating. This causes driving beam segment 3200 to expand relative to passive segment 3500, such that driving beam segment 3200 bends passive segment 3500 about its anchor point 3530, and away from the plane of the paper. At the same time, driving beam segment 3300 also heats and expands, bending passive segment 3600 about its pivot point at hinged flexure 3650. This causes MEMS hysteretic thermal actuator 3000 to rise up and over stationary contact 3700, as shown in FIG. 17.

Figure 18:
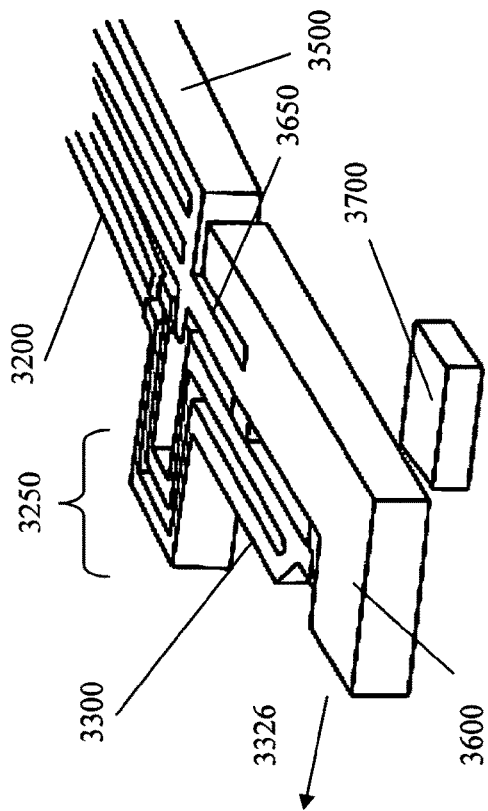

When the voltage applied to anchor points 3130 and 3140 is removed, current ceases to flow and heat ceases to be generated. At this point, the heat flows back out of the device mainly through anchor points 3130 and 3140. This cools driving beam segment 3200 before driving beam segment 3300 cools, which lowers MEMS hysteretic thermal actuator 3000 onto the stationary contact 3700. This situation is depicted in FIG. 18. MEMS hysteretic thermal device 3000 may remain latched on stationary contact by frictional forces or a combination of frictional and normal forces. This latching may close, for example, an electrical switch.

Using a latching current pulse of about 3000 μsec in duration and about 160 mA in amplitude, MEMS hysteretic thermal actuator 3000 may be expected to move a total diagonal distance of about 11 μm, rising by about 8 μm and moving laterally about 8 μm.

Figure 19:
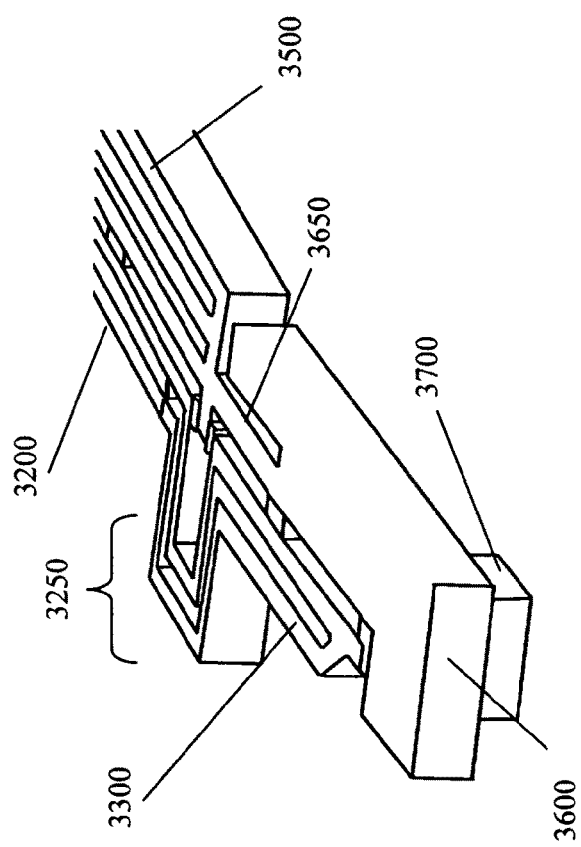

When it is desired to open the electrical switch, a shorter duration and/or lower amplitude pulse may be applied to MEMS hysteretic thermal actuator 3000, which will raise the driving beam segment 3200 sufficiently to free the tip of passive segment 3600 from the stationary contact, as described earlier with respect to MEMS hysteretic thermal actuator 500. The unlatching is shown in FIG. 19. MEMS hysteretic thermal actuator 3000 will then immediately move back in direction 3326. In one exemplary embodiment, the unlatching pulse has a duration of 1000 μsec and 160 mA.

Although the embodiments 500-3000 described above each have at least two substantially straight beam segments in the cantilever, it should be understood that a MEMS hysteretic device may also be formed using a single cantilevered arcuate beam. In this embodiment, the arcuate actuator is disposed adjacent to an arcuate drive beam, and tethered to the drive beam by at least two dielectric tethers, one at the tip of the arcuate actuator and one at an intermediate location. The amount of hysteresis provided by such an arcuate embodiment may depend on the curvature of the cantilever and the location of the dielectric tethers. However, in general, the cantilever having two segments disposed orthogonally to each other may have a larger amount of hysteresis, and may therefore be more suitable for making a latching switch.

An exemplary method for fabricating the MEMS hysteretic actuator 3000 will be described next. Although the method is directed primarily to the fabrication of MEMS hysteretic actuator 3000, it should be understood that the method may be adapted to fabricate MEMS hysteretic actuators 500-2600. The MEMS hysteretic actuator 3000 may be fabricated on any convenient substrate 4000, for example silicon, silicon-on-insulator (SOI), glass, or the like.

Because in FIGS. 20-27, the MEMS hysteretic actuator is shown in cross section, only a few of the beam segments of the MEMS hysteretic thermal actuator can be seen in the figures, as the other segments may be disposed in a plane which is not easily depicted in the figures. For example, in FIG. 27, element 4200 may be understood to depict driving beam segment 3200 in MEMS hysteretic actuator 3000. Element 4300, corresponding to driving beam segment 3300, lies partially in the same plane as element 4200, and behind element 4200, and is thus partially obscured by element 4200. However, it should be understood that the driving beam segment 3300 may be formed at the same time as, and using similar or identical processes to those used to form the driving beam segment 4200 which is depicted in FIGS. 20-27. Similarly, only one structure 4500, may represent passive segment 3500 of the MEMS hysteretic thermal actuator 3000 in FIGS. 20-27. However, it should be understood that all components of passive beam 3500, for example heat sink 3550 may be formed at the same time, using similar or identical process steps used to form structure 4500. Accordingly, both the second driving beam portion 3300, the heat sink 3550 and second passive segment 3600 of MEMS hysteretic thermal actuator 3000 may be formed at the same time, using the same process steps and materials, as used to form segments 4200, 4300 and 4500, representing driving beam segment 3200, 3300 and passive segment 3500, respectively.

Figure 20:
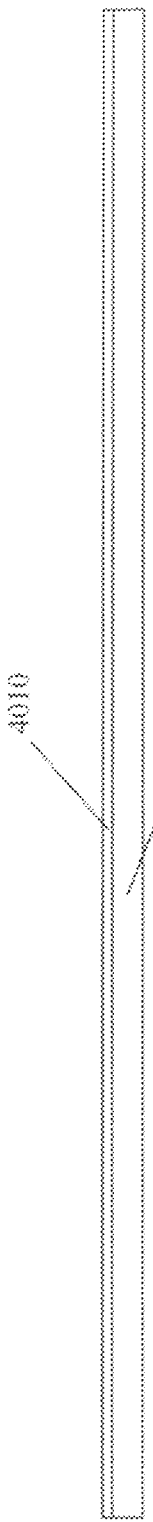
Figure 21:
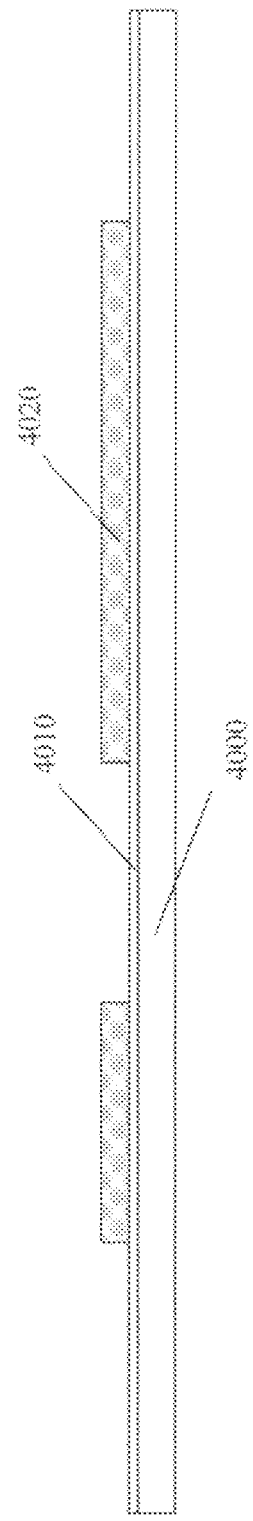

FIG. 20 illustrates a first exemplary step in the fabrication of the MEMS hysteretic thermal actuator 3000. The process begins with the deposition of a seed layer 4010 over the substrate 4000. The seed layer 4010 may be chromium (Cr) and gold (Au), deposited by plasma vapor deposition (PVD) to a thickness of 100-200 nm. Photoresist (not shown) may then be deposited over the seed layer 4010, and patterned by exposure through a mask. A sacrificial layer 4020, such as copper, of a thickness of 2 μm may then be electroplated over the seed layer through the photoresist, as depicted in FIG. 21. The plating solution may be any standard commercially available or in-house formulated copper plating bath. Plating conditions may be particular to the manufacturer's guidelines. However, any other sacrificial material that can be electroplated may also be used. In addition, deposition processes other than plating may be used to form sacrificial layer 4020. The photoresist may then be stripped from the substrate 4000.

Figure 22:
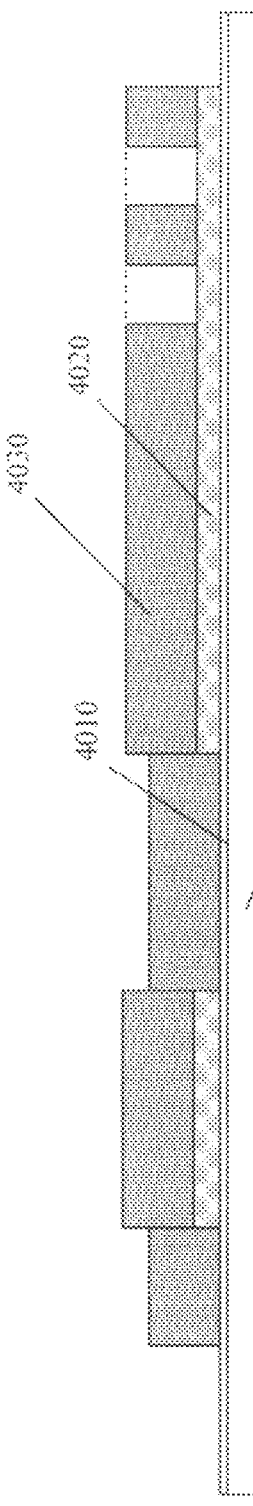

FIG. 22 illustrates a second step in an exemplary process for fabricating MEMS hysteretic thermal actuator 3000. In the second step, another sacrificial layer 4030 is formed over the substrate 4000 and the first sacrificial layer 4020. The second sacrificial layer 4030 may also be copper, with a thickness of about 5 μm. The purpose of the two sacrificial layers 4020 and 4030 is to provide two levels which allow the offset between the elevations of driving beam segment 3200 and passive segment 3500, which provides the out-of-plane movement of the first segment of MEMS hysteretic thermal actuator. The dashed line in FIG. 22 indicates areas further behind the indicated cross section which require a higher elevation, such as for driving beam segment 3300 in FIGS. 14-16. The second sacrificial layer 4030 is also deposited in these areas to provide this higher elevation. This step second step may be performed in the same way as for the first sacrificial layer 4020, by depositing and patterning photoresist, plating the sacrificial layer 4030 on the first sacrificial layer through the photoresist, and stripping the photoresist.

A third step in the exemplary method for fabricating the MEMS hysteretic thermal actuator 3000 is illustrated in FIG. 23. In FIG. 23, the substrate 4000 is again covered with photoresist, which is exposed through a mask with features corresponding to stationary contact 3700 and a corresponding second contact at the distal end of the passive segment 3600. For simplicity, this second contact was not shown in FIGS. 14-19. A conductive material with good electrical transport properties and good contact resistance may then be plated in areas 4600 and 4700. The additional contact material 4600 may be used at the distal end of passive segment 3600 because it may have lower contact resistance than the material that will form the beam 3600. In one exemplary embodiment, gold (Au) is chosen as the contact material 4600 and 4700. Additional gold features may also be plated in this step, such as a bonding ring, which may eventually form a portion of a hermetic seal which may bond a cap wafer over the substrate 4000 and MEMS hysteretic thermal actuator 3000. Another of the gold features may be an external access pad that will provide access to the MEMS hysteretic actuator electrically, from outside the hermetically sealed structure.

Gold may then be electroplated in the areas not covered by the photoresist, to form gold features 4600 and 4700, and any other gold structures needed. The photoresist is then stripped from the substrate 4000. The thickness of the gold features 4600 and 4700 may be, for example, 5 μm. Because the gold contact features 4600 and 4700 may be plated over both the first sacrificial layer 4020 and the second sacrificial layer 4030, the gold contacts may be formed with a lip 4650 at a lower elevation than the rest of gold contact feature 4600. This lip 4650 may mate with a corresponding lip on the stationary gold contact 4700, to form a détente position for the closed switch, so that the switch may be positively latched rather than relying on frictional forces to keep the switch closed. However, it should be understood that MEMS hysteretic thermal actuator 3000 may be formed without this lip as well, as shown in FIGS. 14-19.

If desired or needed, an optional step may be included in the process at this point, which is illustrated in FIG. 24. This optional step is the deposition of another contact material over the surface of the stationary gold contact 3700 or 4700. This additional contact material may be chosen to improve the mechanical properties of the contact metals. For example, palladium, or a gold-cobalt alloy may be sputtered over stationary contact 4700, which may reduce the tendency of the two gold contacts 4600 and 4700 to adhere to one another after touching. Other additional metals may include ruthenium, platinum, gold-platinum alloy, and gold-nickel alloy, for example.

FIG. 25 illustrates a fifth step in an exemplary method for fabricating the MEMS hysteretic thermal actuator 3000. In FIG. 25, photoresist (not shown) is once again applied over the substrate 4000, and patterned according to the features in a mask. The exposed portions of the photoresist are then dissolved as before, exposing the appropriate areas of the seed layer 4010 and sacrificial layers 4020 and 4030. The exposed seed layer 4010 and sacrificial layers 4020 and 4030 may then be electroplated with nickel to form the features 4200, 4300 and 4500. As described above, feature 4200 may correspond to driving beam segment 3200, and feature 4500 may correspond to passive segment 3500. Feature 4300 may correspond to driving beam 3300 in FIGS. 14-16, and is deposited over the second sacrificial layer 4030, shown as the dashed line in FIG. 22. Although only beam segments 3200, 3300 and 3500 are shown in this step, it should be understood that passive beam segment 3600 may be formed using substantially similar or identical techniques, at the same time as passive beams segment 3200, 3300 and 3500. However, since passive beam segment 3600 may be located directly adjacent to, and in the same plane as driving beam portion 3300 and passive segment 3500, only driving beam segments 3200, 3300 and passive segments 3500 are depicted in FIG. 25. Furthermore, although passive beam 3500 is represented only by the single feature 4500, it should be understood that any additional structures such as heat sink 3550 may be formed using similar or identical processes to those shown. The gold contact 4600 may be affixed to the nickel beam 4500 by the natural adhesion of the gold to the nickel, after deposition. Although nickel is chosen in this example, it should be understood that any other conductive material that can be electroplated may also be used. In addition, deposition processes other than plating may be used to form beams 4200 and 4500. The photoresist may then be stripped from the substrate 4000.

FIG. 26 illustrates a fifth step in the fabrication of the MEMS hysteretic thermal actuator 3000. In FIG. 17, a polymeric, nonconducting material 4800 such as the negative tone photo-patternable polymer, photoresist SU-8 is deposited over the substrate 4000, and beams 4200 and 4500. The photoresist 4800 is then cross-linked, by for example, exposure to UV light. The unexposed resist is then dissolved and removed from the substrate 4000 and structures 4200 and 4500 in all areas that the dielectric tether should be absent. This step may form the dielectric tethers 3251 and 3253, as well as other tethers indicated in the preceding FIGS. 14-19. The remaining photoresist may then be cured by, for example, baking. While SU-8 is used in this embodiment, it should be understood that this is exemplary only, and that any other non-conducting material may be used to form the tethers 4800.

FIG. 27 illustrates a sixth step in the fabrication of the MEMS hysteretic thermal actuator 3000. In this step, the beams 4200, 4500 and 4600 may be released by etching the underlying sacrificial copper layers 4020 and 4030. Suitable etchants may include, for example, an isotropic etch using an ammonia-based Cu etchant. The Cr and Au seed layer 4010 may then also be etched using, for example, a wet etchant such as iodine/iodide for the Au and permanganate for the Cr, to expose the SiO$_2$ surface of the substrate 4000. Although not shown in FIG. 27, it should be understood that structures 4200 and 4500 may be anchored to the substrate 4000 by anchors plated in an area without sacrificial layers 4010 and 4020. These anchors may form anchor points 3130, 3140 and 3530. However, because the cross section shown does not include any anchor points, they are not shown in FIG. 27. The substrate 4000 with the MEMS hysteretic thermal actuator 3000 may then be rinsed and dried, and its fabrication is essentially complete.

The resulting MEMS hysteretic actuator 3000 may then be encapsulated in a protective lid or cap wafer. Details relating to the fabrication of a cap wafer may be found in co-pending U.S. patent application Ser. No. 11/211,625, incorporated by reference herein in its entirety.

It should be understood that one gold feature may be used as an external access pad for electrical access to the MEMS hysteretic thermal actuator 3000, such as to supply a signal to the MEMS hysteretic thermal actuator 3000, or to supply a voltage the terminals 3130 or 3140 in order to energize the drive loops of the actuator, for example. The external access pad may be located outside the bond line which will be formed upon the bonding of a cap layer to the substrate 4000. Alternatively, electrical connections to MEMS hysteretic actuator may be made using through-wafer vias, such as those disclosed in co-pending U.S. patent application Ser. No. 11/211,624, U.S. patent application Ser. No. 11/482,944, and U.S. patent application Ser. No. 11/541,774, each of which is incorporated herein by reference in its entirety.

In each of the previous embodiments, an electrical signal is presumed to flow along the cantilevered beam to a stationary contact located under the tip of the beam. However, it is also envisioned to configure the MEMS hysteretic device such that an electrical signal flows between two stationary electrodes located on the substrate surface under the MEMS hysteretic actuator itself. In this case, the contact material 4600 disposed on the distal end of the second beam segment may provide the electrical connection between the stationary electrodes. Such an exemplary embodiment is described in co-pending U.S. patent application Ser. No. 11/334,438, incorporated by reference herein in its entirety.

While various details have been described in conjunction with the exemplary implementations outlined above, various alternatives, modifications, variations, improvements, and/or substantial equivalents, whether known or that are or may be presently unforeseen, may become apparent upon reviewing the foregoing disclosure. For example, while MEMS hysteretic thermal actuators are described which have two segments, it should be understood that any number of additional segments may also be used. Furthermore, although the cantilevers are described as having straight segments, it should be understood that this is exemplary only, and that the cantilever may also have an arcuate shape. While the embodiments described above relate to a microelectromechanical actuator, it should be understood that the techniques and designs described above may be applied to any of a number of other microelectromechanical devices, such as valves and switches. Accordingly, the exemplary implementations set forth above, are intended to be illustrative, not limiting.

What is claimed is:

1. A method of manufacturing a hysteretic micromechanical device on a surface of a substrate comprising:
    forming a first beam segment configured to move in a direction having a component perpendicular to the substrate surface;
    forming a second beam segment configured to move in a direction having a component parallel to the substrate surface;
    forming a flexure joining the first beam segment to the second beam segment, wherein a distal end of the second beam segment is driven in a first trajectory during activation and a second trajectory during relaxation of the first beam segment and the second beam segment.

2. The method of claim 1, wherein forming the first beam segment and the second beam segment further comprises:
    forming the first beam segment coupled at a proximal end to the substrate at an anchor point, and to the flexure at a distal end;
    forming the second beam segment coupled at a proximal end to the flexure, and coupled to a contact at the distal end.

3. The method of claim 2, wherein forming the first beam segment and the second beam segment comprises:
forming a driving beam segment which expands when current is driven through the driving beam segment; and
forming a passive beam segment;
coupling to the driving beam segment to the passive beam segment with at least one dielectric tether, so that the driving beam segment transmits motion to the passive beam segment by the dielectric tether.

4. The method of claim 3, wherein coupling the driving beam segment to the passive beam segment comprises:
applying a photo-patternable polymer over the driving beam segment and the passive beam segment;
exposing and developing the photo-patternable polymer to form the dielectric tether between the driving beam segment and the passive beam segment; and
baking the photo-patternable polymer to form the dielectric tether.

5. The method of claim 3, further comprising:
releasing the first beam segment and the second beam segment by removing a sacrificial layer beneath the first beam segment and the second beam segment, except in the vicinity of the anchor point.

6. The method of claim 3, wherein the at least one dielectric tether comprises a photo-patternable polymer.

7. The method of claim 2, wherein forming the first beam segment and the second beam segment comprises:
forming the first beam segment and the second beam segment by plating at least one of nickel and a nickel alloy onto a seed layer through a photoresist stencil.

8. The method of claim 2, further comprising:
plating a contact material on a sacrificial layer;
forming the second beam segment over the sacrificial layer such that a distal end of the second beam segment is coupled to the contact material.

9. The method of claim 2, wherein the first beam segment and the second beam segment comprise at least one of nickel and a nickel alloy.

10. The method of claim 1, wherein forming the first beam segment comprises:
forming a first driving beam segment which expands when current is driven through the driving beam segment; and
forming a first passive beam segment coupled to the first driving beam segment and moved by the expansion of the first driving beam segment.

11. The method of claim 10, wherein the first driving beam segment is disposed at an average elevation different from an average elevation defined by the first passive beam segment.

12. The method of claim 11, wherein the flexure provides a conductive path between the first driving beam segment of the first beam segment and the second driving beam segment of the second beam segment, and wherein the first passive beam segment of the first beam segment has at least one of a rectangular box shape and a triangular shape.

13. The method of claim 1, wherein forming the second beam segment comprises:
forming a second driving beam segment which expands when current is driven through the driving beam segment; and
forming a second passive beam segment coupled to the second driving beam segment and moved by the expansion of the driving beam segment.

14. The method of claim 13, wherein the second driving beam portion disposed adjacent to and at substantially the same average elevation as the passive beam portion.

15. The method of claim 13, further comprising:
forming at least one stationary electrode affixed to the substrate surface, wherein the contact material is configured to make contact with the stationary electrode after the current is applied to the first and the second driving beam segments, wherein the stationary electrode comprises at least one of palladium, gold, a gold-cobalt alloy, ruthenium, platinum, gold-platinum alloy, and gold-nickel alloy.

16. The method of claim 1, further comprising:
coupling the first beam segment to the substrate at an anchor point disposed at a proximal end of the first beam segment; and
coupling the second beam segment to the first beam segment at the flexure, wherein the flexure defines a proximal end of the second beam segment.

17. A method of manufacturing a hysteretic micromechanical device on a surface of a substrate comprising:
forming a first beam segment coupled to the substrate at an anchor point at a proximal end and configured to move in a direction having a component perpendicular to the substrate surface;
forming a second beam segment coupled to a contact a distal end, and configured to move in a direction having a component parallel to the substrate surface;
forming a flexure joining the first beam segment at a distal end and a the second beam segment at a proximal end, wherein the first beam segment and the second beam segment are driven in a first trajectory during activation and a second trajectory during relaxation
plating a contact material on a sacrificial layer;
forming the second beam segment over the sacrificial layer such that a distal end of the second beam segment is coupled to the contact material;
forming a stationary contact on the substrate surface by plating at least one of gold, palladium, a gold-cobalt alloy, ruthenium, platinum, a gold-platinum alloy, and gold-nickel alloy over the substrate surface, wherein the stationary contact interacts with the contact material on the distal end of the second beam segment to form terminals of an electrical switch.

18. The method of claim 17, further comprising:
forming the contact material at a distal end of the second beam segment, and wherein the flexure is located at about $2/3$ of a distance from the anchor point to the distal end of the second beam segment.

19. An apparatus for forming a hysteretic micromechanical device on a surface of a substrate, comprising:
means for forming a first beam segment configured to move in a direction having a component perpendicular to the substrate surface;
means for forming a second beam segment configured to move in a direction having a component parallel to the substrate surface;
means for forming a flexure joining the first beam segment to the second beam segment, wherein a distal end of the second beam segment is driven in a first trajectory during activation and a second trajectory during relaxation of the first beam segment and the second beam segment.

* * * * *